(12) United States Patent
Zuo

(10) Patent No.: US 11,985,198 B2
(45) Date of Patent: May 14, 2024

(54) METHOD, APPARATUS, AND SYSTEM FOR SESSION REESTABLISHMENT OR SESSION SHARING, AND STORAGE MEDIUM

(71) Applicant: TENCENT TECHNOLOGY (SHENZHEN) COMPANY LTD, Guangdong (CN)

(72) Inventor: Xin Zuo, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 17/684,964

(22) Filed: Mar. 2, 2022

(65) Prior Publication Data

US 2022/0191291 A1    Jun. 16, 2022

Related U.S. Application Data

(63) Continuation of application No. PCT/CN2021/077518, filed on Feb. 23, 2021.

(30) Foreign Application Priority Data

Apr. 2, 2020  (CN) .......................... 202010255296.7

(51) Int. Cl.
*G06F 15/16*    (2006.01)
*H04L 67/141*   (2022.01)
(Continued)

(52) U.S. Cl.
CPC .......... *H04L 67/141* (2013.01); *H04L 67/143* (2013.01); *H04L 67/146* (2013.01)

(58) Field of Classification Search
CPC .... H04L 67/141; H04L 67/143; H04L 67/146
(Continued)

(56) References Cited

U.S. PATENT DOCUMENTS 6,456,626 B1 * 9/2002 Whiting ............. H04Q 11/0478
                                                   370/409
7,539,127 B1 * 5/2009 Shaffer ................ H04L 67/145
                                                   370/216
(Continued)

FOREIGN PATENT DOCUMENTS

CN    106941732 A    7/2017
CN    110199494 A    9/2019
(Continued)

OTHER PUBLICATIONS

International Search Report for PCT/CN2021/077518 dated May 14, 2021 (PCT/ISA/210).

(Continued)

*Primary Examiner* — Bharat Barot
(74) *Attorney, Agent, or Firm* — Sughrue Mion, PLLC

(57) ABSTRACT

A method, an apparatus, a device and a system for session reestablishment and a computer storage medium. The method includes: transmitting a session reestablishment request of reestablishing a predetermined session to a session receiver, in a case that a session initiator determines that a predetermined session established with the session receiver is interrupted and the session receiver supports reestablishment of the predetermined session; and reestablishing, by the session initiator, the predetermined session with the session receiver according to a session reestablishment parameter of the predetermined session in a case that an acknowledgment for the session reestablishment request is received from the session receiver. The session reestablishment parameter is determined based on a status parameter of the predetermined session during interruption. Additionally, a method, an apparatus, a device and a system for session sharing, and a computer storage medium.

18 Claims, 12 Drawing Sheets

(51) Int. Cl.
*H04L 67/143* (2022.01)
*H04L 67/146* (2022.01)

(58) Field of Classification Search
USPC .................................. 709/202–203, 227–228
See application file for complete search history.

(56) References Cited

U.S. PATENT DOCUMENTS

| | | | | |
|---|---|---|---|---|
| 8,051,180 | B2* | 11/2011 | Mazzaferri | H04L 67/141 |
| | | | | 709/227 |
| 8,099,504 | B2* | 1/2012 | Cherian | H04L 67/14 |
| | | | | 709/227 |
| 8,793,389 | B2* | 7/2014 | Lindner | H04M 3/42221 |
| | | | | 709/227 |
| 9,191,445 | B2* | 11/2015 | Morelli, Jr. | H04L 67/141 |
| 10,404,810 | B2* | 9/2019 | Li | H04L 67/141 |
| 10,630,786 | B2* | 4/2020 | Srinivasa Gopalan | |
| | | | | H04L 67/146 |
| 2005/0198397 | A1* | 9/2005 | Park | H04L 67/142 |
| | | | | 709/227 |
| 2014/0153416 | A1 | 6/2014 | Brandes et al. | |
| 2015/0282005 | A1 | 10/2015 | Du et al. | |
| 2016/0021253 | A1 | 1/2016 | Petit-Huguenin | |
| 2020/0275510 | A1* | 8/2020 | Zhang | H04W 76/11 |

FOREIGN PATENT DOCUMENTS

| | | |
|---|---|---|
| CN | 111416874 A | 7/2020 |
| EP | 3 386 133 A1 | 10/2018 |
| WO | 2019/040092 A1 | 2/2019 |

OTHER PUBLICATIONS

International Preliminary Report on Patentability dated Sep. 29, 2022 with a Translation of the Written Opinion of the International Searching Authority in Application No. PCT/CN2021/077518.
Extended European Search Report dated Dec. 7, 2022 in Application No. 21780931.8.

* cited by examiner

METHOD, APPARATUS, AND SYSTEM FOR SESSION REESTABLISHMENT OR SESSION SHARING, AND STORAGE MEDIUM

CROSS-REFERENCE TO RELATED APPLICATION(S)

This application is a continuation application of International Application No. PCT/CN2021/077518, filed on Feb. 23, 2021, which claims priority to Chinese Patent Application No. 202010255296.7, filed with the China National Intellectual Property Administration on Apr. 2, 2020, the disclosures of which are incorporated by reference in their entireties.

FIELD

The disclosure relates to the field of network communication technologies, and in particular, to a method, an apparatus, a device and a system for session reestablishment, a method, an apparatus, a device and a system for session sharing, and a computer storage medium.

BACKGROUND

In network communication, a session needs to be established on a link between a session initiator and a session receiver, to transmit data. Generally, establishment of a session requires a plurality of handshakes according to an agreement followed, to determine whether the session initiator and the session receiver support establishment of the session and to negotiate various session parameters. For example, the IEEE 802.11 protocol defined by the Institute of Electrical and Electronics Engineers (IEEE) specifies an establishment process of a block acknowledgment (Block Ack, BA) session. Both the session initiator and the session receiver need to perform two handshakes for establishment of any BA session based on the establishment process. In addition, the two handshakes need to be performed in both an initial establishment process and a reestablishment process, which definitely requires large overheads of a signaling stream, resulting in low efficiency of the session reestablishment.

SUMMARY

For non-initial establishment of a session, for example, when the session is reestablished or the session is shared from one link to another, because parameters in the non-initial establishment are basically the same as those in initial establishment, there may be redundancy in a session establishment process with a plurality of handshakes. Based on this, embodiments of the disclosure provide a method, an apparatus, and a system for session reestablishment or session sharing, a computer device, and a computer storage medium, which can simplify a session reestablishment process and a session sharing process to improve the efficiency of session reestablishment and session sharing.

An embodiment of the disclose may provide a method for session reestablishment, including:
transmitting a session reestablishment request of reestablishing a predetermined session to a session receiver, in a case that the predetermined session established with the session receiver is interrupted and the session receiver is determined as supporting reestablishment of the predetermined session; and
receiving, from the session receiver, an acknowledgment for the session reestablishment request, and reestablishing the predetermined session with the session receiver according to a session reestablishment parameter of the predetermined session, the session reestablishment parameter of the predetermined session being determined based on a status parameter of the predetermined session during interruption.

An embodiment of the disclosure may further provide a method for session reestablishment, including:
receiving a session reestablishment request of reestablishing a predetermined session from a session initiator, the predetermined session being interrupted after initially established with the session initiator; and
transmitting an acknowledgment for the session reestablishment request to the session initiator, to reestablish the predetermined session with the session initiator according to a session reestablishment parameter of the predetermined session, the session reestablishment parameter of the predetermined session being determined based on a status parameter of the predetermined session during interruption.

An embodiment of the disclosure may further provide a method for session sharing, including:
transmitting, to a session receiver, a session sharing request of sharing a predetermined session, the predetermined session being a session established with the session receiver on a first link, to implement data transmission with the session receiver; and
receiving, from the session receiver, an acknowledgment for the session sharing request, and sharing the predetermined session to at least one second link different from the first link, so that the data transmission with the session receiver is implemented on the first link and the at least one second link.

An embodiment of the disclosure may further provide a method for session sharing, including:
receiving, from a session initiator, a session sharing request of sharing a predetermined session, the predetermined session being a session established with the session initiator on a first link, to implement data transmission with the session initiator; and
transmitting an acknowledgment for the session sharing request to the session initiator, to share the predetermined session to at least one second link different from the first link, so that the data transmission with the session initiator is implemented on the first link and the at least one second link.

An embodiment of the disclosure may further provide an apparatus for session reestablishment, including: a determining module, configured to determine whether a session receiver supports reestablishment of a predetermined session, in a case that the predetermined session established with the session receiver is interrupted; a request transmitting module, configured to transmit a session reestablishment request of reestablishing the predetermined session to the session receiver, in a case that the predetermined session established with the session receiver is interrupted and the session receiver is determined as supporting reestablishment of the predetermined session; and a reestablishment module, configured to reestablish, in response to that an acknowledgment for the session reestablishment request is received from the session receiver, the predetermined session with the session receiver according to a session reestablishment parameter of the predetermined session, the session reestablishment parameter of the predetermined session being determined based on a status parameter of the predetermined session during interruption.

An embodiment of the disclosure may further provide an apparatus for session reestablishment, including: a receiving module, configured to receive a session reestablishment request of reestablishing a predetermined session from a session initiator, the predetermined session being interrupted after initially established with the session initiator; and an acknowledgment transmitting module, configured to transmit an acknowledgment for the session reestablishment request to the session initiator, to reestablish the predetermined session with the session initiator according to a session reestablishment parameter of the predetermined session, the session reestablishment parameter of the predetermined session being determined based on a status parameter of the predetermined session during interruption.

An embodiment of the disclosure may further provides an apparatus for session sharing, including: a request transmitting module, configured to transmit, to a session receiver, a session sharing request of sharing a predetermined session, the predetermined session being a session established with the session receiver on a first link, to implement data transmission with the session receiver; and a sharing module, configured to share, in response to that an acknowledgment for the session sharing request is received from the session receiver, the predetermined session to at least one second link different from the first link, so that the data transmission with the session receiver is implemented on the first link and the at least one second link.

An embodiment of the disclosure may further provide an apparatus for session sharing, including: a receiving module is configured to receive, from a session initiator, a session sharing request of sharing a predetermined session, the predetermined session being a session established with the session initiator on a first link, to implement data transmission with the session initiator; and an acknowledgment transmitting module, configured to transmit an acknowledgment for the session sharing request to the session initiator, to share the predetermined session to at least one second link different from the first link, so that the data transmission with the session initiator is implemented on the first link and the at least one second link.

An embodiment of the disclosure may further provide a system for session reestablishment, including the apparatus for session reestablishment as a session initiator provided in the embodiment of the disclosure, and the apparatus for session reestablishment as a session receiver provided in the embodiment of the disclosure.

An embodiment of the disclosure may further provide a system for session sharing, including the apparatus for session sharing as a session initiator provided in the embodiment of the disclosure, and the apparatus for session sharing as a session receiver provided in the embodiment of the disclosure.

An embodiment of the disclosure may further provide a computing device, including a memory and a processor, the memory storing computer executable instructions, the computer executable instructions, when run on the processor, implementing the method for session reestablishment provided in the embodiment of the disclosure.

An embodiment of the disclosure may further provide a computing device, including a memory and a processor, the memory storing computer executable instructions, the computer executable instructions, when run on the processor, implementing the method for session sharing provided in the embodiment of the disclosure.

An embodiment of the disclosure may further provide a non-volatile computer-readable storage medium, the computer-readable storage medium storing computer executable instructions, the computer executable instructions, when run on a processor, implementing the method for session reestablishment provided in the embodiment of the disclosure.

An embodiment of the disclosure may further provide a non-volatile computer-readable storage medium, the computer-readable storage medium storing computer executable instructions, the computer executable instructions, when run on a processor, implementing the method for session sharing provided in the embodiment of the disclosure.

In the method for session reestablishment provided in the embodiments of the disclosure, after an initially established session is interrupted, a session initiator sends a session reestablishment request to a session receiver, and after the session receiver transmits an acknowledgment for the session reestablishment request to the session initiator, the session can be reestablished. The session initiator and the session receiver only need one handshake to reestablish the session. Similarly, in the method for session sharing provided in the embodiments of the disclosure, when a session initiator and a session receiver need to share a session established on a link to other links, the session initiator transmits a session sharing request to the session receiver, and after the session receiver transmits an acknowledgment for the session sharing request to the session initiator, the session can be shared to other links. The session initiator and the session receiver only need one handshake to share the session to other links. In this way, handshakes can be reduced in the session reestablishment process and the session sharing process, to reduce overheads of a signaling stream, improve the efficiency of session reestablishment and session sharing, and improve the working efficiency of a system for session reestablishment and a system for session sharing.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

Before the embodiments of the disclosure in detail are introduced, some related terms need to be explained.

1. Session: a process of communication and data transmission between a session initiator and a session receiver. The session is established through a signaling handshake between the session initiator and the session receiver, and may be interrupted after being deleted or expiration.

2. Block acknowledgment (Block Ack, BA) session: a common session form in a Wi-Fi network. A session initiator continuously sends a plurality of data packets in the form of a block, and a session receiver feeds back a BA message including a plurality of acknowledgments according to the received information, rather than confirming the data packets one by one, so as to improve the efficiency of data transmission. In addition, the term ADDBA in the following is an abbreviation of ADD Block Ack.

3. Multi-link device (MLD): a device that supports transmitting data on a plurality of links simultaneously; for example, the plurality of links may be on different frequency bands.

4. Session reestablishment: after a session established between a pair of devices (a session initiator and a session receiver) is interrupted due to deletion or expiration, a process of reestablishing the session between the pair of devices is referred to as session reestablishment. When at least one device in the pair of devices is a multi-link device, the session may be reestablished on a link on which the session is initially established, or may be reestablished on other links.

5. Session sharing: a session established on a link between a pair of multi-link devices (a session initiator and a session receiver) is shared to other links, so that the session is simultaneously preformed or valid on at least two links.

Figure 1:
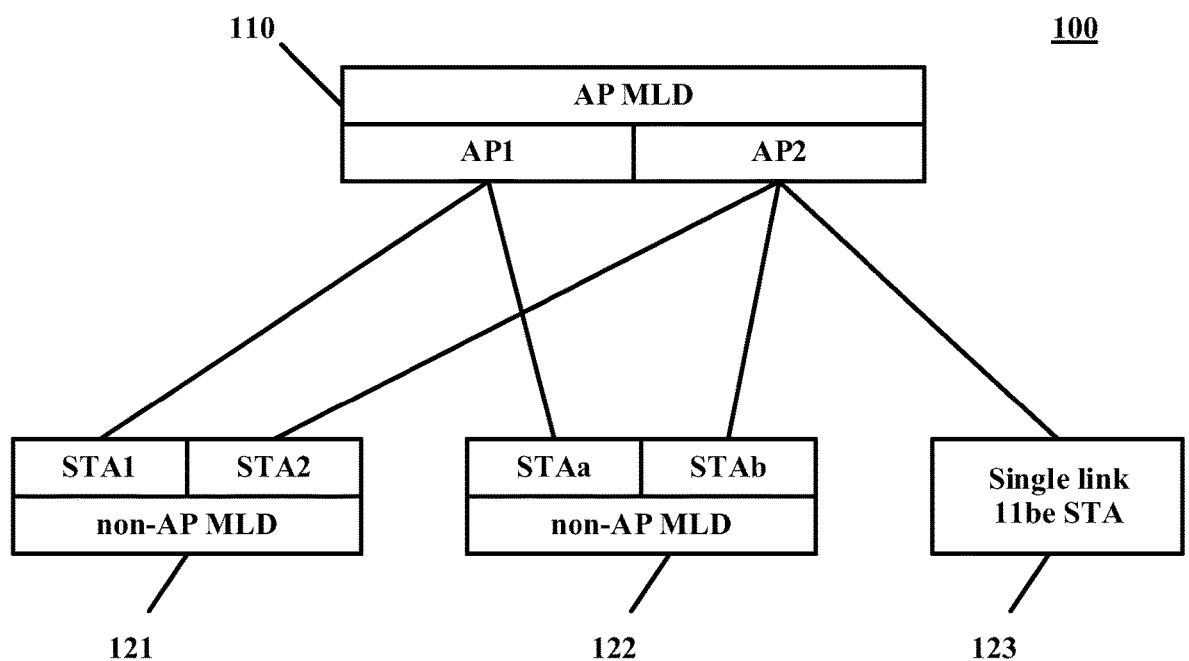
FIG. 1 is a schematic diagram of an implementation environment of a method according to an embodiment of the disclosure.

FIG. 1 is a schematic diagram of an implementation environment of a method according to an embodiment of the disclosure, which schematically shows an example of an environment 100 of a method for session reestablishment and/or a method for session sharing. For example, the environment 100 includes four devices 110, 121, 122, and 123. The device 110 is shown as a multi-link device that serves an access point (AP) device and includes two access points AP1 and AP2. The devices 121 and 122 are shown as multi-link devices that serve as non-access point devices, where the device 121 includes two stations STA1 and STA2, and the device 122 includes two stations STAa and STAb. The device 123 is shown as a single link device and includes, for example, a station 11be STA that supports the 802.11be protocol. A connection line between each station and a corresponding access point can represent a link between devices. Different access points or stations of the multi-link devices 110, 121, and 122 may have different addresses, and independent sessions may be established between the devices on different links shown in the figure; for example, a BA session is established based on the 802.11 protocol.

The devices in the FIG. 1 are merely exemplary, but not limitative. For example, the device 110 may be the multi-link device that serves as the access point device as shown in the figure, or may be another single link device. The multi-link device and the single link device may be base station devices, routing and exchanging devices or other computing devices. Similarly, the devices 121, 122, and 123 may be non-access point devices as shown in the figure, such as mobile phones, laptops, and tablets that support communication on a single link or multiple links, or may be other access point devices that support communication on a single links or multiple links.

Figure 2:
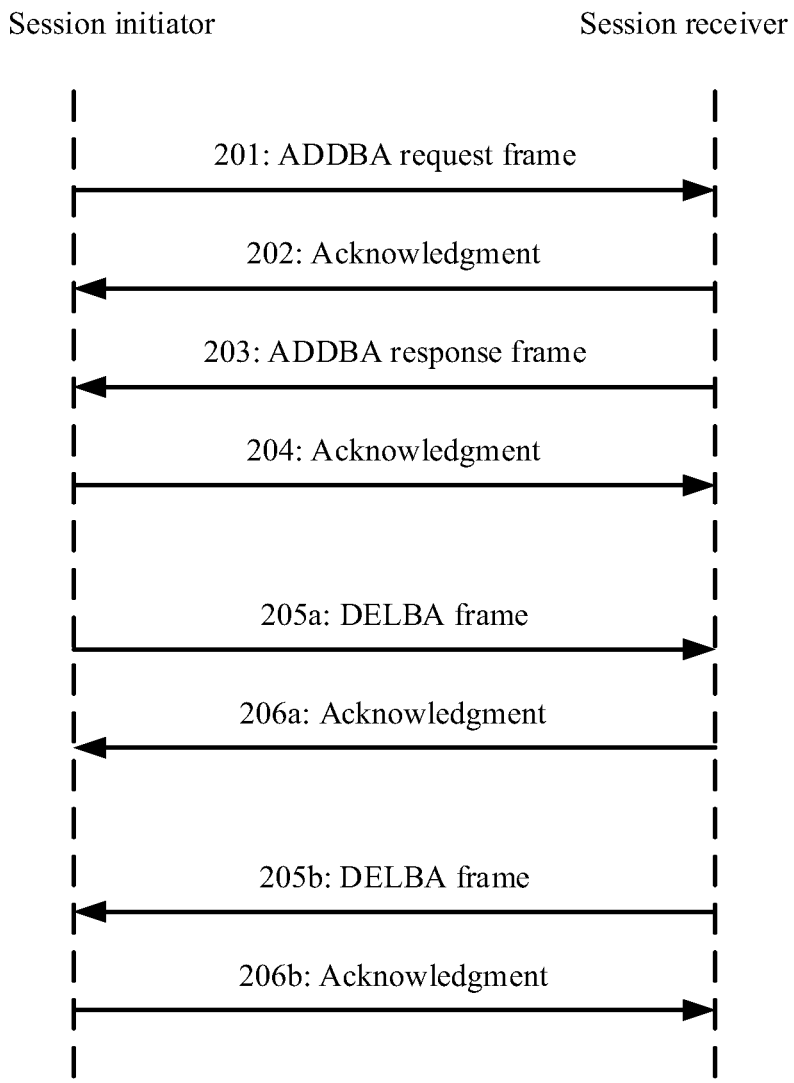
FIG. 2 is an information interaction diagram of a method for establishing and deleting a session in the related art.

FIG. 2 is a flowchart of a method 200 for establishing and deleting a BA session between a session initiator and a session receiver according to the 802.11 protocol. The following uses FIG. 2 as an example to describe a process of a method for establishing and deleting a session in the related art. Operations 201 to 204 show a process of establishing a BA session between the session initiator and the session receiver through two handshakes. Operations 205a, 205b, 206a, and 206b show a process of deleting the established BA session.

Operation 201: The session initiator sends an ADDBA request frame to the session receiver.

The ADDBA request frame is used for requesting to establish a BA session with the session receiver. In some embodiments, the ADDBA request frame may include the following fields:

| No. | Information |
|-----|-------------|
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7 | GCR Group Address element (optional) |
| 8 | Multi-band (optional) |
| 9 | TCLAS (optional) |
| 10 | ADDBA Extension (optional) |

The main fields include: (1) Block Ack Action, which may have 256 values, where only three BA operations are defined currently, that is, field values "0", "1", and "2" are used to represent an ADDBA request of requesting establishment of a BA session, an ADDBA response for responding to establishment of the BA session, and DELBA for deleting the BA session, the remaining 253 field values are not defined, and the field can distinguish functions of different BA action frames; (2) Block Ack Parameter Set, which includes operation parameters required for the BA session, such as TID corresponding to the BA session, a policy of the BA session, and a recommended cache size, where the TID may be considered as a session identifier, and for example, a maximum of 16 BA sessions (TID=0, 1 . . . , 15) may be established between a pair of devices; (3) Block Ack Timeout Value, which defines duration of the BA session; and (4) Block Ack Starting Sequence Control, which defines a starting sequence number of data packets in the BA session.

Operation 202: The session receiver sends an acknowledgment (ACK) for the ADDBA request frame to the session initiator.

Operation 203: The session receiver sends an ADDBA response frame for the ADDBA request frame to the session initiator.

The ADDBA response frame is used for responding to the request of establishing the BA session. In some embodiments, the ADDBA response frame may include the following fields:

| No. | Information |
|---|---|
| 1 | Category |
| 2 | Block Ack Action |
| 3 | Dialog Token |
| 4 | Status Code |
| 5 | Block Ack Parameter Set |
| 6 | Block Ack Timeout Value |
| 7 | GCR group address element (optional) |
| 8 | Multi-band (optional) |
| 9 | TCLAS (optional) |
| 10 | ADDBA Extension (optional) |

As shown above, the ADDBA response frame has a structure similar to that of the ADDBA request frame, and also includes main fields such as Block Ack Action, Block Ack Parameter Set, and Block Ack Timeout Value. The ADDBA response frame further includes a Status Code field. If the field is Success, the current session establishment succeeds; if the field is Reject", the current session establishment fails, and the ADDBA request frame needs to be resent to perform another handshake.

Operation 204: The session initiator sends an acknowledgment (ACK) for the ADDBA response frame to the session receiver.

So far, if the session receiver returns Success in the ADDBA response frame to the session initiator, the BA session is successfully established. The BA session successfully established can be identified by using an address of the session initiator, an address of the session receiver, and the TID. Further, a BA session between a known pair of session initiator and session receiver can be identified by a TID, where a value of the TID may range from 0 to 15.

After the BA session is successfully established, data transmission is performed between the session initiator and the session receiver. During or after the data transmission, either of the session initiator and the session receiver deletes the current BA session by sending a DELBA frame, and the other party sends an acknowledgment (ACK) for the DELBA frame. Similarly, the DELBA frame includes fields such as Block Ack Action, and Block Ack Parameter Set. In some embodiments, the DELBA frame may include the following fields:

| No. | Information |
|---|---|
| 1 | Category |
| 2 | Block Ack Action |
| 3 | DELBA Parameter Set |
| 4 | Reason Code |
| 5 | Block Ack Parameter Set |

-continued

| No. | Information |
|---|---|
| 6 | Multi-band (optional) |
| 7 | TCLAS (optional) |

Operations 205a and 206a show a process that the session initiator deletes a current session, and the operations are described as follows.

Operation 205a: The session initiator sends a DELBA frame to the session receiver.

Herein, the DELBA frame includes a TID of a session to be deleted, and is used for indicating, to the session receiver, deletion of the session corresponding to the TID.

Operation 206a: The session receiver sends an acknowledgment (ACK) for the DELBA frame to the session initiator, so that a corresponding session is deleted.

In some embodiments, operations 205b and 206b show a process that the session receiver deletes a current session.

Operation 205b: The session receiver sends a DELBA frame to the session initiator.

The DELBA frame includes a TID of a session to be deleted, and is used for indicating, to the session initiator, deletion of the session corresponding to the TID.

Operation 206b: The session initiator sends an acknowledgment (ACK) for the DELBA frame to the session receiver, so that a corresponding session is deleted.

According to the foregoing process specified in the 802.11 protocol, it requires two handshakes to establish any session. The above only describes fields of the ADDBA request frame, the ADDBA response frame, or the DELBA frame that are involved in the description of the disclosure; other fields that are not described have the same meaning as the corresponding fields defined in the 802.11 protocol, and are not described in detail herein again.

Figure 3A:
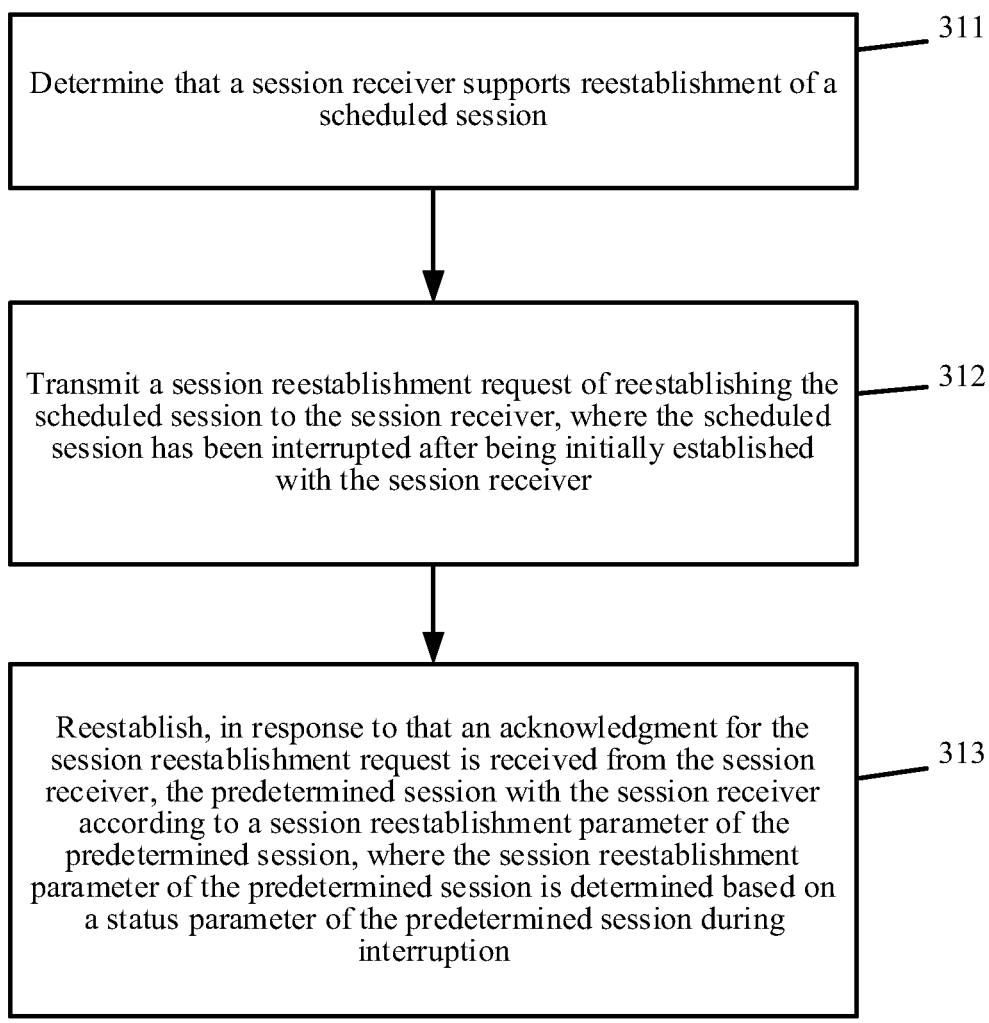
FIG. 3A and FIG. 3B are schematic flowcharts of methods for session reestablishment according to an embodiment of the disclosure.
Figure 3B:
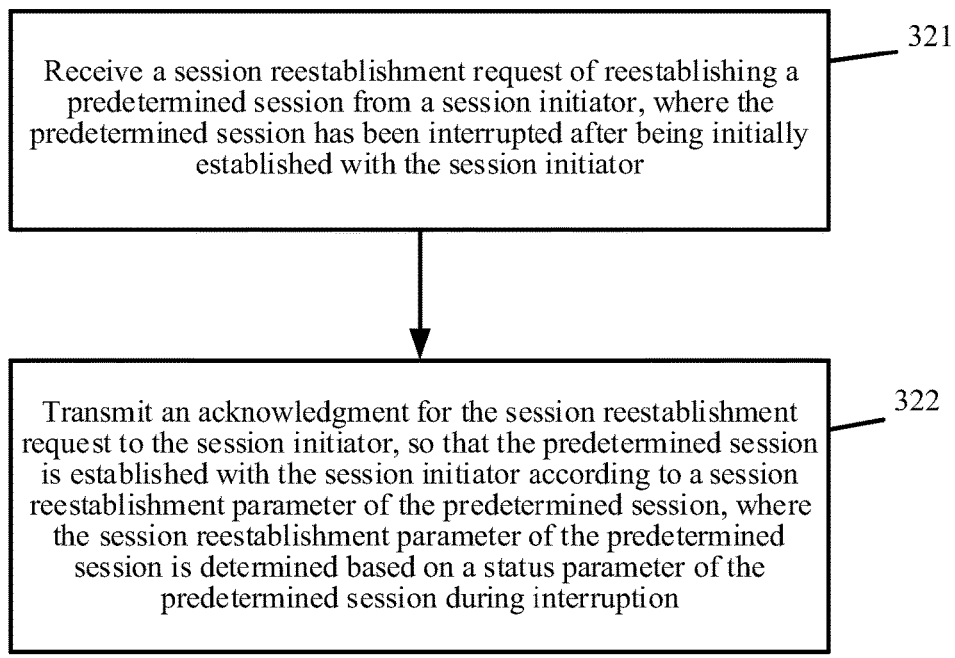

FIGS. 3A and 3B are schematic flowcharts of a method 300A and a method 300B for session reestablishment according to an embodiment of the disclosure. The method 300A may be executed by a session initiator, and correspondingly, the method 300B may be executed by a session receiver. For example, either of the session initiator and the session receiver may be any of various computing devices, such as a mobile phone, a laptop, a tablet, a base station device, and a routing and exchanging device.

Operation 311: Determine that a session receiver supports reestablishment of a predetermined session.

In some embodiments, it may be determined, when the predetermined session is interrupted, that the session receiver supports reestablishment of the predetermined session. For example, it may be determined, during session deletion in operations 205a and 206a or operations 205b and 206b shown in FIG. 2, that the session receiver supports reestablishment of the predetermined session. When the session receiver initiates session deletion, the determination can be implemented through the following operations: receiving, from the session receiver, a session deletion frame, where the session deletion frame is used for requesting to delete the predetermined session, to interrupt the predetermined session; and sending, in response to the session deletion frame including a session-reestablishment-supported indicator, an acknowledgment for the session deletion frame to the session receiver, so as to determine, while the predetermined session is deleted, that the session receiver supports reestablishment of the predetermined session.

When the session initiator initiates session deletion, the determination can be implemented through the following operations: sending a session deletion frame to the session receiver, where the session deletion frame includes a session-reestablishment-supported indicator and is used for requesting to delete the predetermined session, to interrupt the predetermined session; and in response to that an acknowledgment for the session deletion frame is received from the session receiver, determining, while the predetermined session is deleted, that the session receiver supports reestablishment of the predetermined session.

In some embodiments, when the predetermined session is deleted, the session initiator and the session receiver may respectively store a status parameter of the session during interruption, so that a session reestablishment parameter required for reestablishing the session is determined subsequently based on the stored status parameter. Alternatively, only the session initiator stores the status parameter of the session during interruption. When the session initiator requests to reestablish the session subsequently, a session reestablishment parameter required for reestablishing the session is determined based on the stored status parameter, and the session reestablishment parameter is sent to the session receiver, so that the session is reestablished based on the session reestablishment parameter, which is not limitative.

Figure 3C:
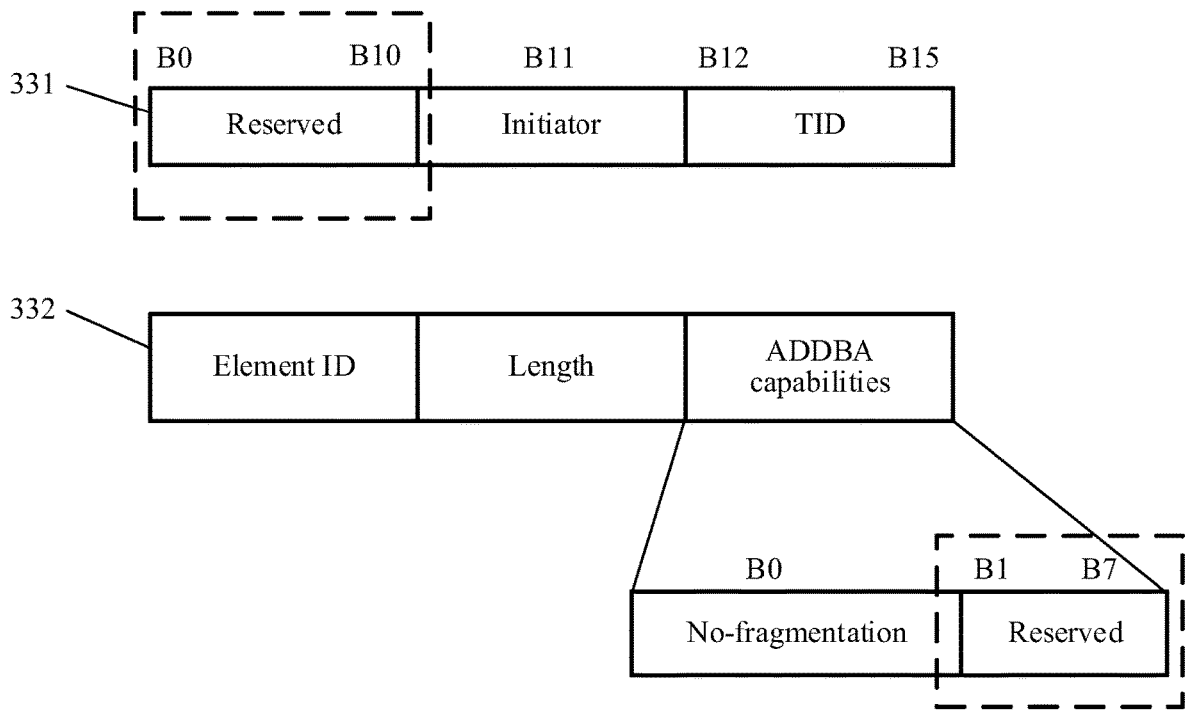
FIG. 3C is a schematic diagram of some of frame fields according to an embodiment of the disclosure.

In an example, in the embodiment about the BA session, the sent session deletion frame may be similar to the DELBA frame sent in operations 205a, and 206a or operations 205b and 206b described in FIG. 2. The difference is that in the session deletion frame, a reserved bit in the DELBA parameter set (DELBA Parameter Set) field in the DELBA frame is used to represent a bit about session reestablishment, and the bit about session reestablishment may be set to represent the session-reestablishment-supported indicator above. 331 in FIG. 3C shows the DELBA Parameter Set field, which includes a Reserved field, an Initiator field, and a TID field, and shows the reserved bits (bit B0 to bit B10 in the reserved field, 11 bits in total) with a dashed box. The bit about session reestablishment may be defined in such reserved bits and the bit about session reestablishment may be set to be used as the session-reestablishment-supported indicator. In this way, when the session initiator intends to determine, while deleting the current BA session, that the session receiver supports reestablishment of the current BA session, the session initiator may send a session deletion frame including the session-reestablishment-supported indicator (that is, a DELBA frame in which the bit about session reestablishment is set (for example, the bit is set to 1)) to the session receiver. When the session receiver receives the session deletion frame, the session receiver may read the session-reestablishment-supported indicator and send an acknowledgment (ACK) to the session initiator to indicate that reestablishment of the corresponding session is supported. Similarly, the session receiver may send the session deletion frame (that is, the DELBA frame in which the bit about session reestablishment is set (for example, the bit is set to 1)), to inform the session initiator, while the BA session is deleted, that the session receiver supports reestablishment of the current BA session.

In other embodiments, it may be determined, when the predetermined session is initially established, that the session receiver supports reestablishment of the predetermined session. This is advantageous, because reestablishment of a session that is interrupted due to any reason can be supported (for example, the session is interrupted due to session expiration). For example, it may be determined, in the session establishment operations 201 to 204 shown in the FIG. 2, that the session receiver supports reestablishment of the predetermined session. The determination may be implemented through the following operations: sending a first session request frame to the session receiver, where the first session request frame is used for requesting to establish the predetermined session with the session receiver and includes the session-reestablishment-supported indicator; receiving, from the session receiver, an acknowledgment for the first session request frame and a session response frame for the first session request frame; and sending, in response to determining that the session response frame includes the session-reestablishment-supported indicator, an acknowledgment for the session response frame to the session receiver, to determine, while the predetermined session is established with the session receiver, that the session receiver supports reestablishment of the predetermined session.

In an example, in the embodiment about the BA session, the session request frame sent by the session initiator and the session response frame received from the session receiver may be similar to the ADDBA request frame and the ADDBA response frame in operations 201 to 204 described in FIG. 2. The difference is in that in the session request frame and the session response frame, a bit about session reestablishment is defined by using reserved bits in an ADDBA Capabilities field in an ADDBA extension field in the ADDBA request frame and the ADDBA response frame, and the bit about session reestablishment may be set to be used as the session-reestablishment-supported indicator. 332 in FIG. 3C shows fields in ADDBA Extension, including an Element ID field, a Length field, and an ADDBA Capabilities field, and shows the reserved bits (bit B1-bit B7, 7 bits in total) in the ADDBA Capabilities field (including 8 bits) with a dashed box. In this way, when the session initiator intends to determine, while initially establishing the BA session, whether the session receiver supports reestablishment of the BA session, the session initiator may send a session request frame including the session-reestablishment-supported indicator (that is, the ADDBA request frame in which the bit about session reestablishment is set) to the session receiver. When the session receiver receives the session reestablishment frame, the session receiver may read the session-reestablishment-supported indicator, and send an acknowledgment (ACK) and a corresponding session response frame (the ADDBA response frame in which the bit about session reestablishment is set (for example, the bit is set to 1)) to the session initiator to indicate reestablishment of the corresponding session is supported.

Operation 312: Transmit a session reestablishment request of reestablishing the predetermined session to the session receiver, where the predetermined session has been interrupted after being initially established with the session receiver.

In the embodiment of determining, when the predetermined session is interrupted, that the session receiver supports reestablishment of the predetermined session, operation 312 may be implemented through the following operations: sending the session reestablishment frame to the session receiver, where the session reestablishment frame includes a session identifier of the predetermined session. In some embodiments, the session reestablishment frame may further include a session reestablishment parameter of the predetermined session, where the session reestablishment parameter is determined based on a status parameter of the predetermined session during interruption. In some embodiments, the status parameter of the predetermined session during interruption may be updated, so that a starting sequence number of data packets or other proper parameters of the session are updated, to obtain the session reestablishment parameter. The status parameter of the session includes any proper parameter that characterizes the session. In an example, in the BA session, the status parameter includes the TID, the policy of the BA session, and the starting sequence of data packets in the BA session. In some embodiments, the session reestablishment parameter may be the same as the status parameter of the predetermined session during interruption.

In an example, the session reestablishment frame may be customized. For example, in the embodiment about the BA session, a frame format of the session reestablishment frame may be similar to a frame format of the ADDBA request frame. For example, the existing Block Ack Action field may be extended. Based on the existing ADDBA request frame, ADDBA response frame, and DELBA frame, a field value "3" is used to represent an ADDBA resume frame for reestablishment of the BA session. The extended Block Ack Action field can be expressed by the table below:

| Block Ack Action field value | Meaning |
| --- | --- |
| 0 | ADDBA request |
| 1 | ADDBA response |
| 2 | DELBA |
| 3 | ADDBA resume |
| 4-255 | Reserved |

In this way, when the session initiator intends to reestablish a BA session (it has been determined that the session receiver supports reestablishment of the BA session), the session initiator may send a session reestablishment frame in which the value of the Block Ack Action field is set to 3 to the session receiver, so as to reestablish the BA session. To indicate a session to be reestablished, the session reestablishment frame includes a session identifier (TID) of the session to be reestablished. In addition, in some embodiments, the session reestablishment frame may include a starting sequence of data packets in the BA session to be reestablished, to specify a position to resume data transmission. Alternatively, in a case that the session receiver does not store the status parameter of the session, the session reestablishment frame may include a status parameter of the BA session to be reestablished. Alternatively, in a case that the session receiver stores the status parameter, the session reestablishment frame may include a status parameter that needs to be changed of the session, and the session receiver may update the status parameter of the session during interruption based on the status parameter that needs to be changed of the session, to obtain the session reestablishment parameter.

Alternatively, in the embodiment of determining, when the predetermined session is initially established, that the session receiver supports reestablishment of the predetermined session, operation 312 may be implemented through the following operations: sending a second session request frame to the session receiver, where the second session request frame includes a session identifier of the predetermined session and the session-reestablishment-supported indicator. In some embodiments, the second session request frame may include the session reestablishment parameter of the predetermined session.

In an example, in the embodiments about the BA session, the session initiator may send a session request frame, which is the same as the session request frame during initial establishment of the session, that is, the ADDBA request frame in which the bit about session reestablishment is set. To identify the session to be reestablished, the session request frame needs to include a session identifier (TID) of the corresponding BA session. When the session receiver receives the session request frame, if the session receiver learns, through reading, that the received session request frame is targeted to the same frame as the previous session request frame, the session receiver may reboot the BA session automatically, without the session response frame again. Similar to the session reestablishment frame in the foregoing embodiments, the session request frame may also include the status parameter during interruption of the corresponding BA session or the status parameter that needs to be changed.

Operation 313: Reestablish, based on an acknowledgment for the session reestablishment request being received from the session receiver, the predetermined session with the session receiver according to a session reestablishment parameter of the predetermined session, where the session reestablishment parameter of the predetermined session is determined based on a status parameter of the predetermined session during interruption.

In some embodiments, either or both of the session initiator and the session receiver may be a single-link device, for example, the device 123 in FIG. 1. In this case, there is only one link between the session initiator and the session receiver, so initial establishment and reestablishment of the session are both performed on the link. In other embodiments, the session initiator and the session receiver may be multi-link devices, for example, the devices 110, 121 and 122 in FIG. 1. In this case, a plurality of links exist between the session initiator and the session receiver. Assuming that the predetermined session is initially established with the session receiver on a first link and has been interrupted, the session initiator may reestablish the predetermined session with the session receiver on any one of the plurality of links, that is, the predetermined session may be reestablished on the first link or on any other link different from the first link. For example, if a session between the devices 110 and 121 is initially established on a link between AP1 and STA1, when the session is reestablished after being deleted, the session may be reestablished on the link between AP1 and STA1, or reestablished on a link between AP2 and STA2.

In addition, after the reestablished session is interrupted, the session may be reestablished again according to the method described above. Although the embodiments of the disclosure are described in detail herein through a specific example of the BA session, the embodiments of the disclosure may be similarly applicable to other types of sessions or sessions based on other protocols.

According to the method for session reestablishment provided in the embodiments of the disclosure, after determining that the session receiver supports reestablishment of a predetermined session, the session initiator only needs to perform one handshake with the session receiver, that is, the session initiator sends a session reestablishment request to the session receiver, and the session receiver sends an acknowledgment for the session reestablishment request to the session initiator, to reestablish the session. In addition, the session initiator may determine, when the session with the session receiver is initially established or interrupted, that the session receiver supports reestablishment of the predetermined session. As such, the number of handshakes in the session reestablishment process may be reduced to save overheads of a signaling stream, improve the efficiency of session reestablishment, increase the time for data transmission, and improve the efficiency and capacity of the data transmission. Especially in the case of the multi-link devices, for example, different stations of one MLD may initiate independent sessions, the same session establishment process may be repeated many times on different links, which causes extremely high resource overheads. The technical solutions of the disclosure can save more overheads of the signaling stream to increase the time for data transmission greatly, and improve the efficiency and capacity of the data transmission.

The following briefly describes a method 300B for session reestablishment performed by a session receiver with reference to FIG. 3B. All features described in the method 300A are also applicable to the method 300B. To avoid redundancy, some of the features are omitted here. The method 300B and the method 300A have similar technical effects.

Operation 321: Receive a session reestablishment request of reestablishing a predetermined session from a session initiator, where the predetermined session has been interrupted after being initially established with the session initiator.

In some embodiments, it may be confirmed with the session initiator, when the predetermined session is interrupted, that reestablishment of the predetermined session is supported. For example, the interruption of the predetermined session is implemented by deleting the predetermined session. Session deletion may be initiated by the session initiator, and may be implemented through the following operations: receiving a session deletion frame from the session initiator, where the session deletion frame is used for requesting to delete the predetermined session, to interrupt the predetermined session; and sending an acknowledgment for the session deletion frame to the session initiator in response to the session deletion frame including a session-reestablishment-supported indicator to confirm with the session initiator, while the predetermined session is deleted, that reestablishment of the predetermined session is supported. Alternatively, session deletion may be initiated by the session receiver, and may be implemented through the following operations: sending a session deletion frame to the session initiator, where the session deletion frame is used for requesting to delete the predetermined session to interrupt the predetermined session and includes a session-reestablishment-supported indicator to confirm with the session initiator that reestablishment of the predetermined session is supported; and deleting the predetermined session in response to that an acknowledgment for the session deletion frame is received from the session initiator, so as to interrupt the predetermined session.

In other embodiments, it may be confirmed with the session initiator, when the predetermined session is initially established, that reestablishment of the predetermined session is supported. This is advantageous because reestablishment of a session that is interrupted due to any reason can be supported (for example, the session is interrupted due to session expiration). Session reestablishment may be implemented through the following operations: receiving a first session request frame from the session initiator, where the first session request frame is used for requesting to establish the predetermined session with the session initiator; sending, in response to the first session request frame including the session-reestablishment-supported indicator, an acknowledgment for the first session request frame and a session response frame for the first session request frame to the session initiator, where the session response frame includes the session-reestablishment-supported indicator to confirm with the session initiator that reestablishment of the predetermined session is supported; and receiving, from the session initiator, an acknowledgment for the session response frame, so that the predetermined session is established with the session initiator.

Operation 322: Transmit an acknowledgment for the session reestablishment request to the session initiator, so that the predetermined session is established with the session initiator according to a session reestablishment parameter of the predetermined session, where the session reestablishment parameter of the predetermined session is determined based on a status parameter of the predetermined session during interruption.

In the embodiment of confirming with the session initiator, when the predetermined session is interrupted, that reestablishment of the predetermined session is supported, the session receiver may receive the session reestablishment frame from the session initiator as a session reestablishment request, where the session reestablishment frame includes a session identifier of the predetermined session. In some embodiments, the session reestablishment frame may include the session reestablishment parameter of the predetermined session.

In the embodiment of confirming with the session initiator, when the predetermined session is initially established, that reestablishment of the predetermined session is established, the session receiver may receive a second session request frame from the session initiator as a session reestablishment request, where the second session request frame includes the session identifier of the predetermined session and the session-reestablishment-supported indicator. In some embodiments, the second session request frame may include the session reestablishment parameter of the predetermined session. Initialing session reestablishment by sending the second session request frame to the session receiver avoids the need to design a session reestablishment frame separately, thereby saving resources.

In addition, assuming that the predetermined session has been interrupted after being established with the session initiator on a first link, an acknowledgment for the session reestablishment request may be sent to the session initiator, so that the predetermined session is reestablished with the session initiator on one of a plurality of links according to the session reestablishment parameter of the predetermined session, where the plurality of links include the first link.

Figure 4A:
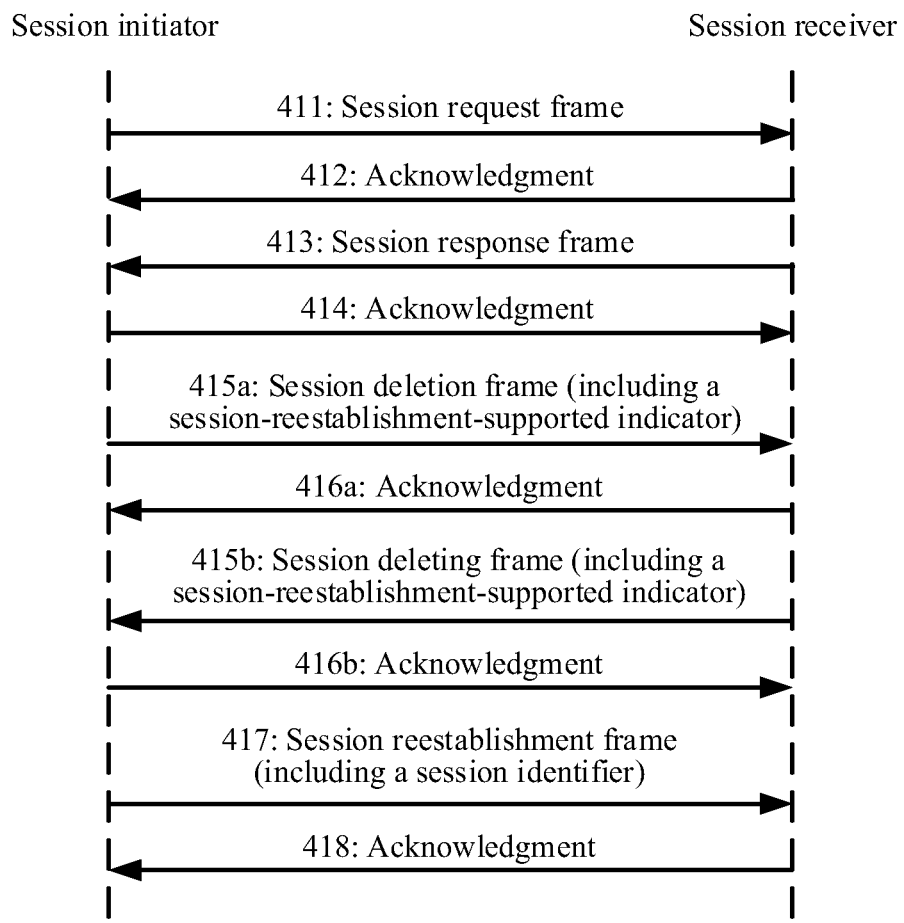
FIG. 4A and FIG. 4B are information interaction diagrams of methods for session reestablishment according to an embodiment of the disclosure.

FIG. 4A is an information interaction diagram of a method for session reestablishment according to an embodiment of the disclosure. A session reestablishment process 400A in the case of determining, when a predetermined session is interrupted, that reestablishment of the predetermined session is supported is shown in the form of the information interaction diagram. In operations 411 to 414, the predetermined session is initially established through two handshakes between a session initiator and a session receiver, which is similar to operations 201 to 204 described in FIG. 2. Operation 415a: The session initiator sends a session deletion frame to the session receiver, where the session deletion frame includes a session-reestablishment-supported indicator and is used for requesting to delete the predetermined session, so that the predetermined session is interrupted. Operation 416a: The session initiator receives, from the session receiver, an acknowledgment for the session deletion frame, and determines, while the predetermined session is deleted, that the session receiver supports reestablishment of the predetermined session. In some embodiments, as described above, the session receiver may initiate deletion of the predetermined session. Operation 415b: The session receiver sends a session deletion frame to the session initiator, where the session deletion frame is used for requesting to delete the predetermined session to interrupt the predetermined session, and includes a session-reestablishment-supported indicator to confirm with the session initiator that reestablishment of the predetermined session is supported. Operation 416b: The session receiver receives, from the session initiator, an acknowledgment for the session deletion frame received, so that the predetermined session is deleted to interrupt the predetermined session. Operation 417: The session initiator sends, to the session receiver, a session reestablishment frame for reestablishing the predetermined session. Operation 418: The session initiator receives, from the session receiver, an acknowledgment for the session reestablishment request, and reestablishes the predetermined session between the session initiator and the session receiver according to a session reestablishment parameter of the predetermined session. For the detail description of the foregoing operations, refer to the contents of FIG. 3A-FIG. 3C. Details are not described herein again.

Figure 4B:
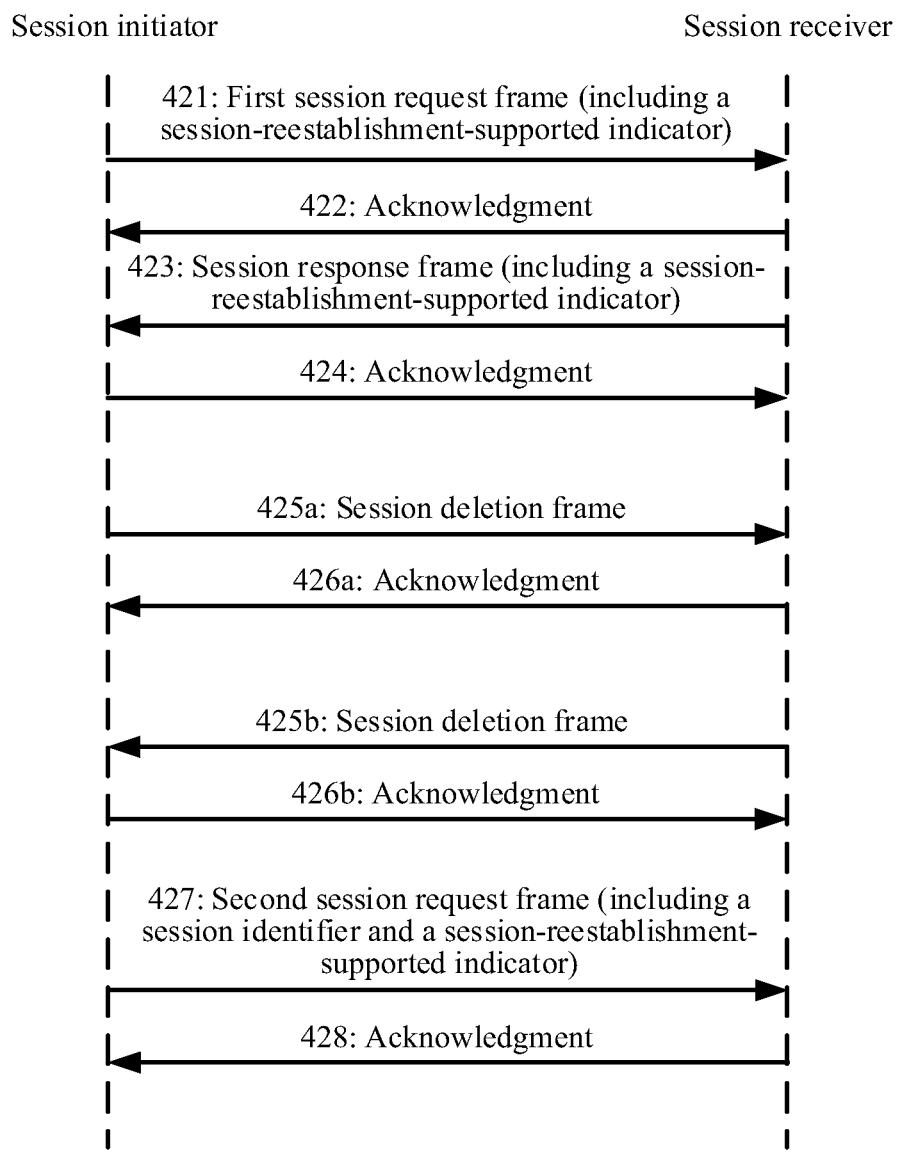

FIG. 4B is an information interaction diagram of a method for session reestablishment according to an embodiment of the disclosure. A session reestablishment process 400A in the case of determining, when a predetermined session is initially established, that reestablishment of the predetermined session is supported is shown in the form of the information interaction diagram. In operation 421 to 424, the predetermined session is initially established, and at the same time, it is determined that a session receiver supports reestablishment of the predetermined session. Operation 421: A session initiator sends a first session request frame to a session receiver, where the first session request frame is used for requesting to establish the predetermined session with the session receiver and includes a session-reestablishment-supported indicator. The session receiver sends an acknowledgment for the first session request frame to the session initiator in operation 422, and sends a session response frame for the first session request frame to the session initiator in operation 423. Operation 424: The session initiator sends an acknowledgment for the session response frame to the session receiver in response to determining that the session response frame includes the session-reestablishment-supported indicator, to determine, while the predetermined session is established between the session initiator and the session receiver, that the session receiver supports reestablishment of the predetermined session. Operations 425a and 426a show that deletion of the predetermined session is initiated by the session initiator; and in some embodiments, operations 425b and 426b show that deletion of the predetermined session is initiated by the session receiver. Operation 427: The session initiator sends a second session request frame to the session receiver, where the second session request frame includes a session identifier of the predetermined session and the session-reestablishment-supported indicator. Operation 428: The session initiator receives, from the session receiver, an acknowledgment for the second session request frame, and reestablishes the predetermined session with the session receiver according to a session reestablishment parameter of the predetermined session. The processes in operations 425a, 426a, 425b, and 426b are similar to operations 205a, 206a, 205b, and 206b described in FIG. 2. For the detailed descriptions of other operations, refer to the contents in FIG. 3A and FIG. 3C. Details are not described herein again.

Figure 5A:
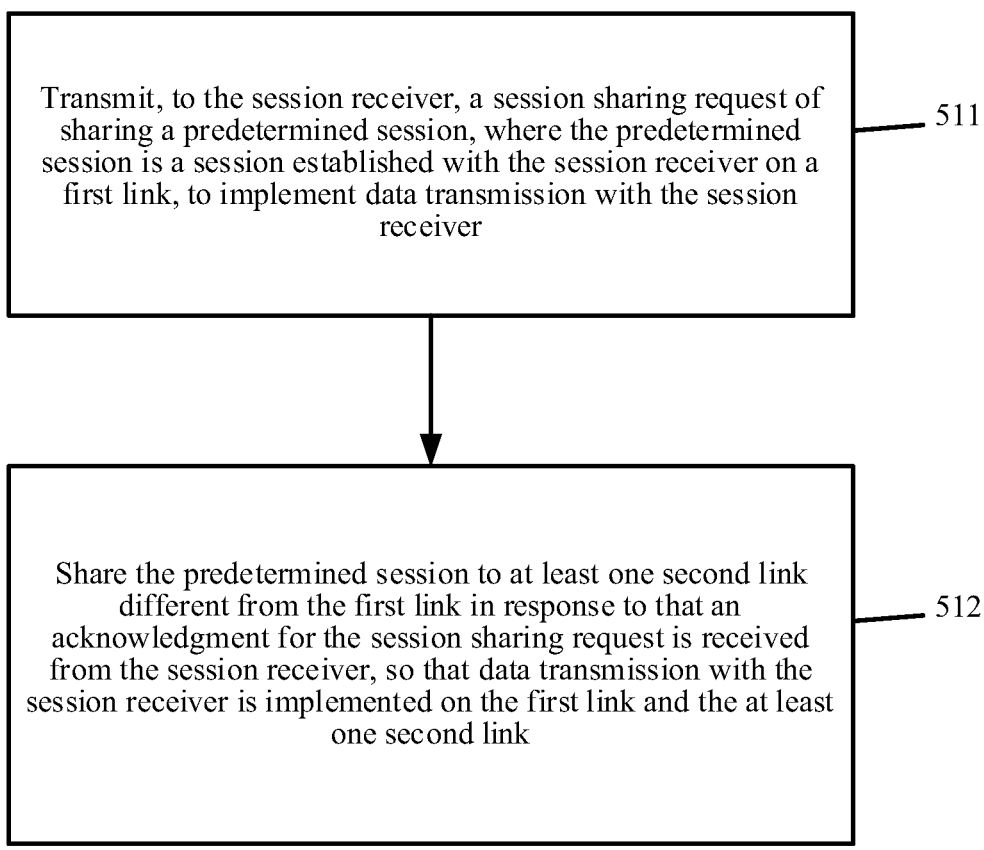
FIG. 5A and FIG. 5B are schematic flowcharts of methods for session sharing according to an embodiment of the disclosure.
Figure 5B:
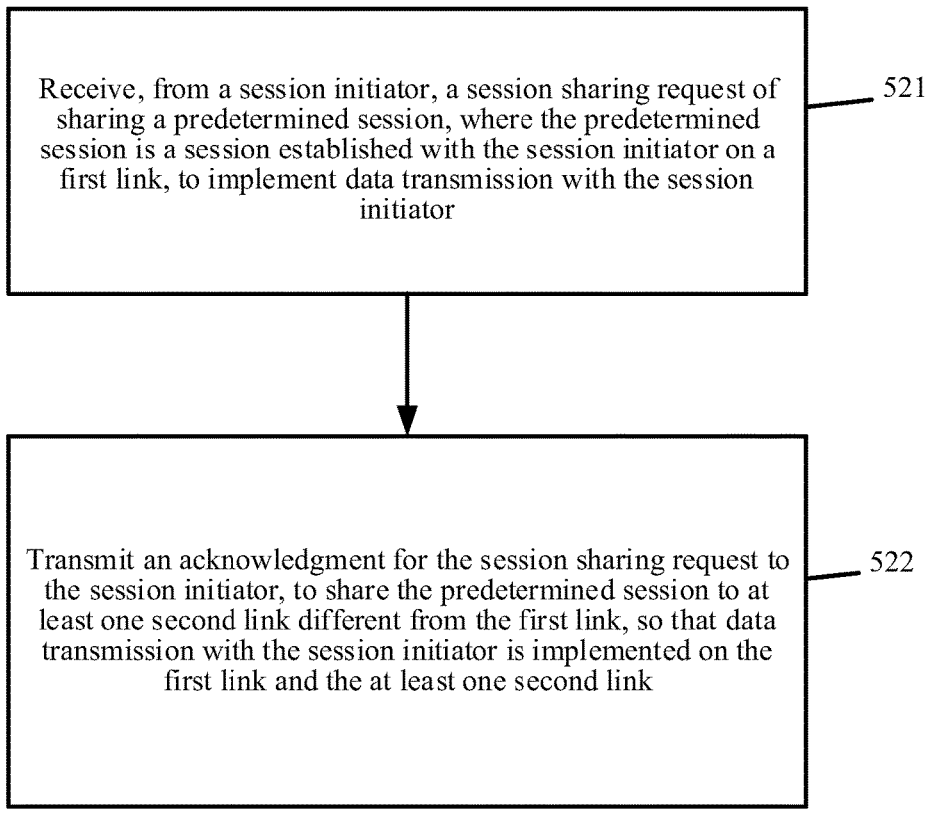

FIGS. 5A and 5B are respectively schematic flowcharts of methods 500A and 500B for session sharing according to the embodiments of the disclosure. For example, the method 500A may be executed by a session initiator, and correspondingly, the method 500B may be executed by a session receiver. For example, either of the session initiator and the session receiver may be any of various computing devices, such as a mobile phone, a laptop, a tablet, a base station device, and a routing and exchanging device.

As shown in FIG. 5A, operation 511: Transmit, to the session receiver, a session sharing request of sharing a predetermined session, where the predetermined session is a session established with the session receiver on a first link, to implement data transmission with the session receiver.

In some embodiments, operation 511 may be implemented through the following operations: sending a session sharing frame to the session receiver, where the session sharing frame includes a session identifier of the predetermined session.

In an example, the session sharing frame may be customized. For example, in the embodiment about a BA session, a frame format of the session sharing frame may be similar to that of the ADDBA request frame. For example, the existing Block Ack Action field may be extended. Based on the existing ADDBA request frame, ADDBA response frame, and DELBA frame, a field value "4" is used to represent an ADDBA share frame for sharing the BA session. The extended Block Ack Action field can be expressed by the table below (assuming that ADDBA resume is also extended; however, it is also possible that only ADDBA share is extended).

| Block Ack Action | Meaning |
| --- | --- |
| 0 | ADDBA request |
| 1 | ADDBA response |
| 2 | DELBA |
| 3 | ADDBA resume |
| 4 | ADDBA share |
| 5-255 | Reserved |

In this way, when the session initiator intends to share a BA session on different links, the session initiator may send a session sharing frame in which the value of the Block Ack Action field is set to 4 to the session receiver. Similarly, the session sharing frame may include a session identifier (TID) of a session to be shared, to indicate which session is to be shared. In some embodiments, the session sharing frame may include a starting sequence number of data packets in a BA session to be shared, to resume transmission of the data packets on different links from the starting sequence number.

In other embodiments, before operation 511, it may be determined, when the predetermined session is established with the session receiver on a first link, that the session receiver supports sharing of the predetermined session. This may include: sending a first session request frame to the session receiver, where the first session request frame is used for requesting to establish the predetermined session with the session receiver and includes the session-sharing-supported indicator; receiving, from the session receiver, an acknowledgment for the first session request frame and a session response frame for the first session request frame; and sending an acknowledgment for the session response frame to the session receiver in response to determining that the session response frame includes the session-sharing-supported indicator, to determine, when the predetermined session is established with the session receiver, that the session receiver supports sharing of the predetermined session. In this case, operation 511 is implemented through the following operations: sending a second session request frame to the session receiver, where the second session request frame includes a session identifier of the predetermined session and the session-sharing-supported indicator.

Figure 5C:
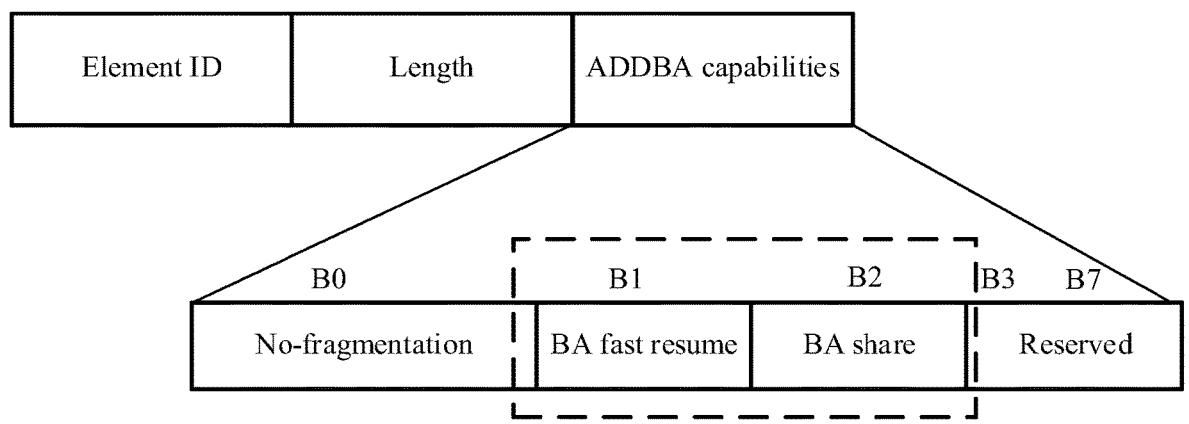
FIG. 5C is a schematic diagram of some of frame fields according to an embodiment of the disclosure.

For example, in the embodiment about a BA session, similar to the descriptions in FIGS. 3A and 3C, in the session request frame and the session response frame, a bit about session sharing is defined by using a reserved bit in an ADDBA Capabilities field in an ADDBA Extension field in an ADDBA request frame and an ADDBA response frame, and the bit about session sharing may be set to be used as the session-sharing-supported indicator. FIG. 5C schematically shows the ADDBA Capabilities field. As shown in the dashed box, bits B1 and B2 of the ADDBA Capabilities field are respectively defined as a bit about session reestablishment (BA Fast Resume), and a bit about session sharing (BA share). However, BA share may be defined while BA fast resume is not defined. In this way, when the session initiator intends to determine, while the BA session is initially established, whether the session receiver supports sharing of the BA session, the session initiator may send the session request frame (the ADDBA request frame in which the bit about session sharing is set (for example, the bit is set to 1)) to the session receiver. When receiving such a session request frame, the session receiver may read the session-sharing-supported indicator, and send an acknowledgment (ACK) and a corresponding session response frame (the ADDBA response frame in which the bit about session sharing is set (for example, the bit is set to 1)) to the session initiator, to indicate that sharing of the corresponding session is supported.

In this embodiment, during persistence of the BA session (that is, the BA session is not interrupted), the session initiator may send a session request frame, which is the same as that during initial establishment of the predetermined session and in which the bit about session sharing is set (for example, the bit is set to 1). Similarly, the session request frame may include a session identifier (TID) of a session to be shared. When the session receiver receives the session request frame, if the session receiver learns, through reading, that the TID therein is the same as the TID of the session that is determined as supporting sharing when initially established, the session receiver may share the BA session automatically, without resending the session response frame. In addition, the session request frame may alternatively include a starting sequence number of data packets in the BA session to be shared, to resume transmission of the data packets on different links starting from the starting sequence number.

It is determined, when the predetermined session is established with the session receiver on the first link, that the session receiver supports sharing of the predetermined session, and the second session request frame is sent to the session receiver to initiate session sharing, thereby avoiding designing a session sharing frame separately, so as to save resources.

Operation 512: Share the predetermined session to at least one second link different from the first link in response to that an acknowledgment for the session sharing request is received from the session receiver, so that data transmission with the session receiver is implemented on the first link and the at least one second link.

For example, in the system shown in FIG. 1, if a session between the device 110 and the device 122 is initially established on a link between AP1 and STAa, the session can be shared to a link between AP2 and STAb according to the foregoing method, so that data of the corresponding session is transmitted on the two links simultaneously. The session may be actually shared on more links, not limited to the two links in the example.

According to the method for session sharing provided in the embodiments of the disclosure, when the session initiator and the session receiver intend to share a session established on one link to other links, only one handshake is needed, that is, the session initiator sends a session sharing request to the session receiver, and the session receiver sends an acknowledgment for the session sharing request to the session initiator. In this way, the number of handshakes in the session sharing (that is, establishment) process may be reduced, to save overheads of a signaling stream, improve the efficiency of session establishment, increase the time for data transmission, and improve the efficiency and capacity of the system.

The following briefly describes a method 500B for session sharing performed by a session receiver with reference to FIG. 5B. All features described in the method 500A are also applicable to the method 500B. To avoid redundancy, some of the features are omitted here. The method 500B and the method 500A have the similar technical effects.

Operation 521: Receive, from a session initiator, a session sharing request of sharing a predetermined session, where the predetermined session is a session established with the session initiator on a first link, to implement data transmission with the session initiator.

In some embodiments, operation 521 may be implemented through the following operations: receiving a session sharing frame from the session initiator, where the session sharing frame includes a session identifier of the predetermined session.

In other embodiments, before operation 521, it may be confirmed with the session initiator, when the predetermined session is established with the session initiator on a first link, that sharing of the predetermined session is supported. This may include: receiving a first session request frame from the session initiator, where the first session request frame is used for requesting to establish the predetermined session with the session initiator; sending, in response to the first session request frame including a session-sharing-supported indicator, an acknowledgment for the first session request frame and a session response frame for the first session request frame to the session initiator, where the session response frame includes the session-sharing-supported indicator to confirm with the session initiator that sharing of the predetermined session is supported; and receiving, from the session initiator, an acknowledgment for the session response frame, so that the predetermined session with the session initiator is established on the first link. In this embodiment, operation 521 is implemented through the following operations: receiving a second session request frame from the session initiator, where the second session request frame includes a session identifier of the predetermined session and the session-sharing-supported indicator.

Operation 522: Transmit an acknowledgment for the session sharing request to the session initiator, to share the predetermined session to at least one second link different from the first link, so that data transmission with the session initiator is implemented on the first link and the at least one second link.

Figure 6A:
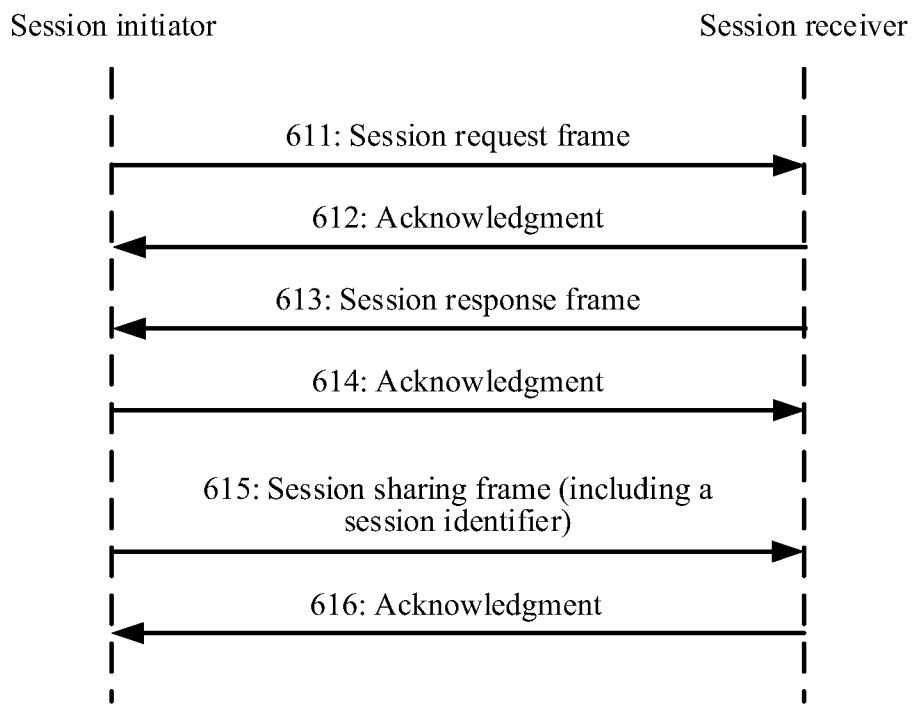
FIG. 6A and FIG. 6B are information interaction diagrams of methods for session sharing according to an embodiment of the disclosure.

FIG. 6A is an information interaction diagram of a method for session sharing according to an embodiment of the disclosure. A method 600A for session sharing is shown in the form of the interaction diagram. In operations 611 to 614, a predetermined session is initially established, and the process is similar to the process of operations 201 to 204 described in FIG. 2. Operation 615: The session initiator sends, to a session receiver, a session sharing frame for sharing a predetermined session, where the session sharing frame includes a session identifier of the predetermined session, and the predetermined session is established with the session receiver on a first link, to implement data transmission with the session receiver. Operation 616: After the session initiator receives, from the session receiver, an acknowledgment for the session sharing frame, the session initiator and the session receiver share the predetermined session to at least one second link different from the first link, so that data transmission between the session initiator and the session receiver is implemented on the first link and the at least one second link.

Figure 6B:
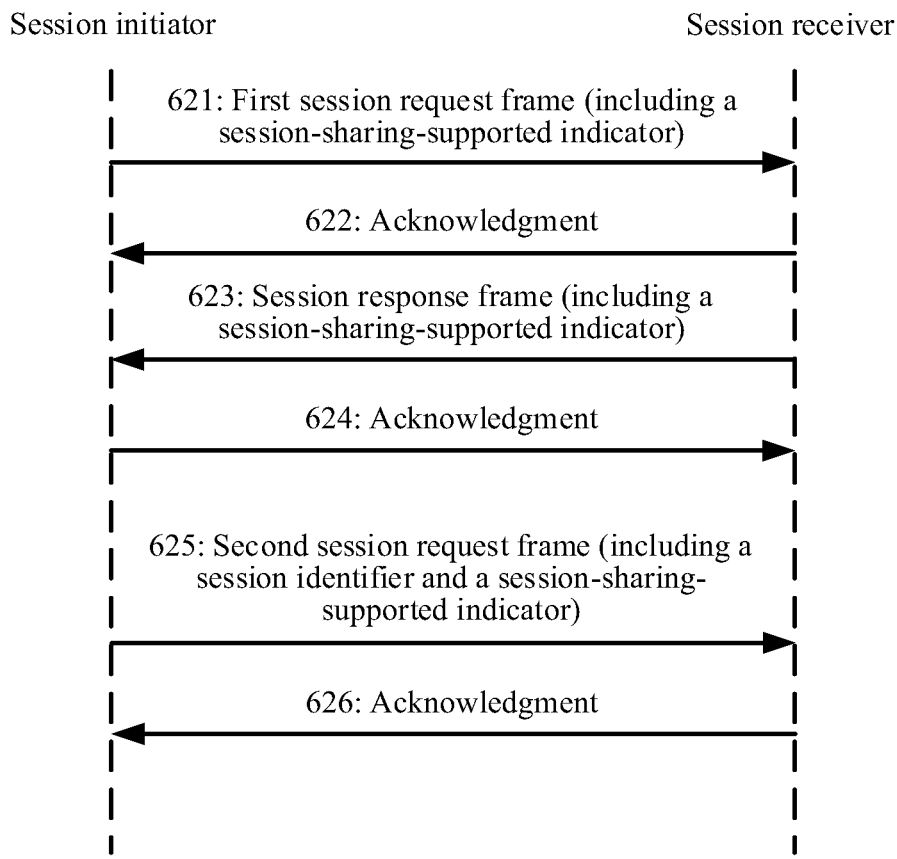

FIG. 6B is an information interaction diagram of a method for session sharing according to an embodiment of the disclosure. A method 600B for session sharing is shown in the form of the interaction diagram, and it is determined, when the predetermined session is initially established, that sharing of the predetermined session is supported. Operation 621: A session initiator sends a first session request frame to a session receiver, where the first session request frame is used for requesting to establish a predetermined session with the session receiver and includes a session-sharing-supported indicator. The session receiver sends an acknowledgment for the first session request frame to the session initiator in operation 622, and sends a session response frame for the first session request frame to the session initiator in operation 623. Operation 624: The session initiator sends an acknowledgment for the session response frame to the session receiver to determine, while the predetermined session is established with the session receiver, that the session receiver supports sharing of the predetermined session. Operation 625: The session initiator sends a second session request frame to the session receiver, where the second session request frame includes a session identifier of the predetermined session and a session-sharing-supported indicator. Operation 626: The session receiver sends an acknowledgment for the second session request frame to the session initiator, so that the session initiator and the session receiver share the predetermined session to at least one second link different from the first link.

Figure 7:
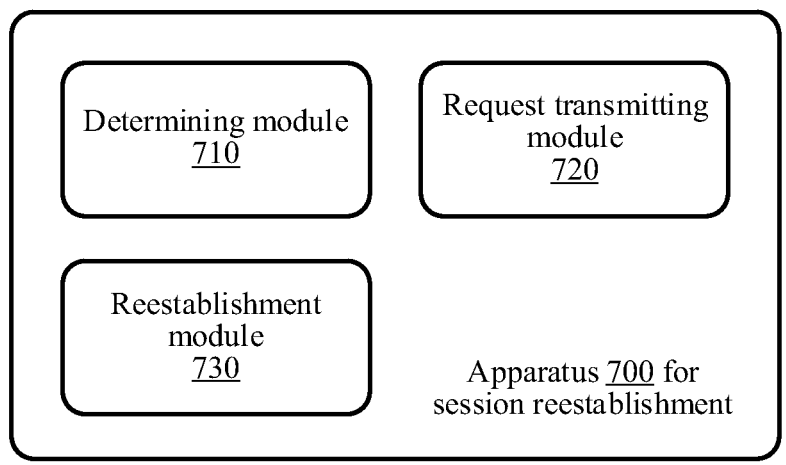
FIG. 7 is a schematic diagram of an apparatus for session reestablishment according to an embodiment of the disclosure.

FIG. 7 is a schematic block diagram of an apparatus 700 for session reestablishment according to an embodiment of the disclosure. The apparatus 700 may include a determining module 710, a request transmitting module 720, and a reestablishment module 730. The determining module 710 is configured to determine that a session receiver supports reestablishment of a predetermined session. The request transmitting module 720 is configured to transmit a session reestablishment request of reestablishing the predetermined session to the session receiver, where the predetermined session has been interrupted after being initially established with the session receiver. The reestablishment module 730 is configured to reestablish, in response to that an acknowledgment for the session reestablishment request is received from the session receiver, the predetermined session with the session receiver according to a session reestablishment parameter of the predetermined session, where the session reestablishment parameter of the predetermined session is determined based on a status parameter of the predetermined session during interruption.

Figure 8:
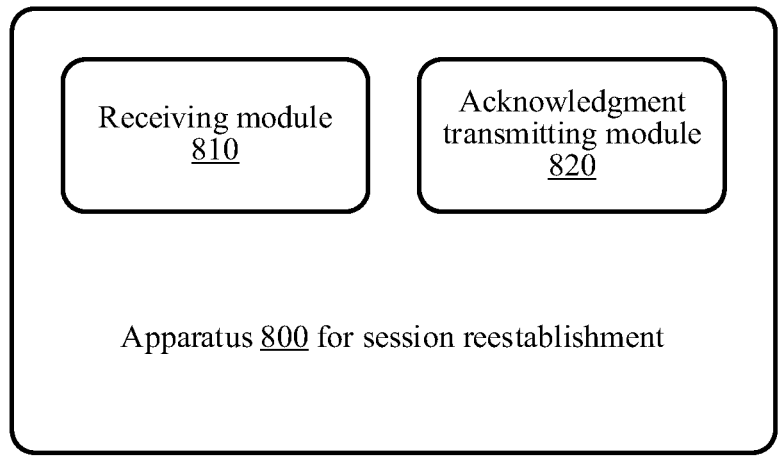
FIG. 8 is a schematic diagram of an apparatus for session reestablishment according to an embodiment of the disclosure.

FIG. 8 is a schematic block diagram of another apparatus 800 for session reestablishment according to an embodiment of the disclosure. The apparatus 800 may include a receiving module 810 and an acknowledgment transmitting module 820. The receiving module 810 is configured to receive a session reestablishment request of reestablishing a predetermined session from a session initiator, where the predetermined session has been interrupted after being initially established with the session initiator. The acknowledgment transmitting module 820 is configured to transmit an acknowledgment for the session reestablishment request to the session initiator, so that the predetermined session is reestablished with the session initiator according to a session reestablishment parameter of the predetermined session, where the session reestablishment parameter of the predetermined session is determined based on a status parameter of the predetermined session during interruption.

The apparatus shown in FIG. 7 may be implemented as the session initiator, and the apparatus shown in FIG. 8 may be implemented as the session receiver to form a system for session reestablishment. The session initiator and the session receiver may interact according to the process described in FIG. 4A or FIG. 4B to implement session reestablishment. In an example, in the application environment described in FIG. 1, the device 110 may serve as the session receiver, and any of the devices 121, 122, and 123 may serve as the session initiator. The session established between them may be reestablished on the same or different links according to the foregoing method.

Figure 9:
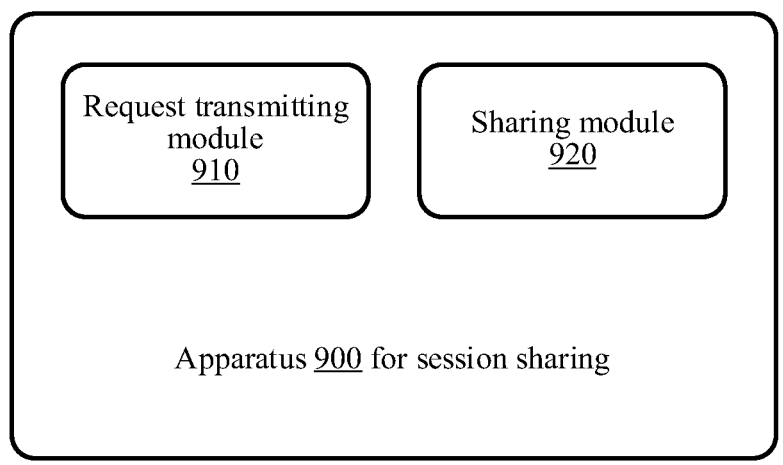
FIG. 9 is a schematic diagram of an apparatus for session sharing according to an embodiment of the disclosure.

FIG. 9 is a schematic block diagram of an apparatus 900 for session sharing according to an embodiment of the disclosure. The apparatus 900 may include a request transmitting module 910 and a sharing module 920. The request transmitting module 910 is configured to transmit, to a session receiver, a session sharing request of sharing a predetermined session, where the predetermined session is a session established with the session receiver on a first link, to implement data transmission with the session receiver. The sharing module 920 is configured to share the predetermined session to at least one second link different from the first link, in response to that an acknowledgment for the session sharing request is received from the session receiver, so that data transmission with the session receiver is implemented on the first link and the at least one second link.

Figure 10:
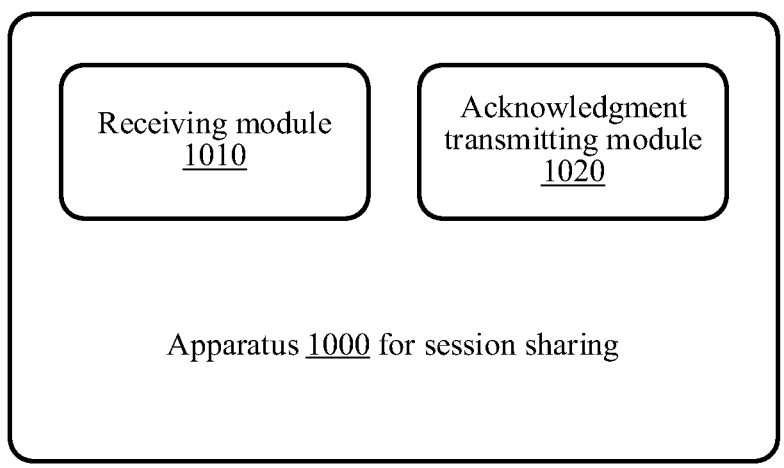
FIG. 10 is a schematic diagram of an apparatus for session sharing according to an embodiment of the disclosure.

FIG. 10 is a schematic block diagram of another apparatus 1000 for session sharing according to an embodiment of the disclosure. The apparatus 1000 may include a receiving module 1010 and an acknowledgment transmitting module 1020. The receiving module 1010 is configured to receive, from a session initiator, a session sharing request of sharing a predetermined session, where the predetermined session is a session established with the session initiator on a first link, to implement data transmission with the session initiator. The acknowledgment transmitting module 1020 is configured to transmit an acknowledgment for the session sharing request to the session initiator, to share the predetermined session to at least one second link different from the first link, so that data transmission with the session initiator is implemented on the first link and the at least one second link.

The apparatus shown in FIG. 9 may be implemented as the session initiator, and the apparatus shown in FIG. 10 may be implemented as the session receiver to form a system for session sharing. The session initiator and the session receiver may interact according to the process described in FIG. 6A or FIG. 6B to implement session sharing. In an example, in the environment described in FIG. 1, the device 110 may serve as the session receiver, and any of the devices 121, 122, and 123 may serve as the session initiator. The session established between them may be reestablished on the same or different links according to the foregoing method.

The apparatuses depicted in FIG. 7 to FIG. 10 may have various features of the corresponding methods described in FIG. 3A to FIG. 6B. To avoid redundancy, the description is not repeated herein.

An embodiment of the disclosure further provides a storage medium, where the storage medium stores a computer program, and the computer program is configured to perform, when running, the method for session reestablishment provided in the embodiments of the disclosure.

An embodiment of the disclosure further provides a storage medium, where the storage medium stores a computer program, and the computer program is configured to perform, when running, the method for session sharing provided in the embodiments of the disclosure.

An embodiment of the disclosure further provides a computing device, including a memory and a processor, where the memory stores computer executable instructions, and when the computer executable instructions are run on the processor, the method for session reestablishment provided in the embodiment of the disclosure is implemented.

An embodiment of the disclosure further provides a computing device, including a memory and a processor, where the memory stores computer executable instructions, and when the computer executable instructions are run on the processor, the method for session sharing provided in the embodiment of the disclosure is implemented.

Figure 11:
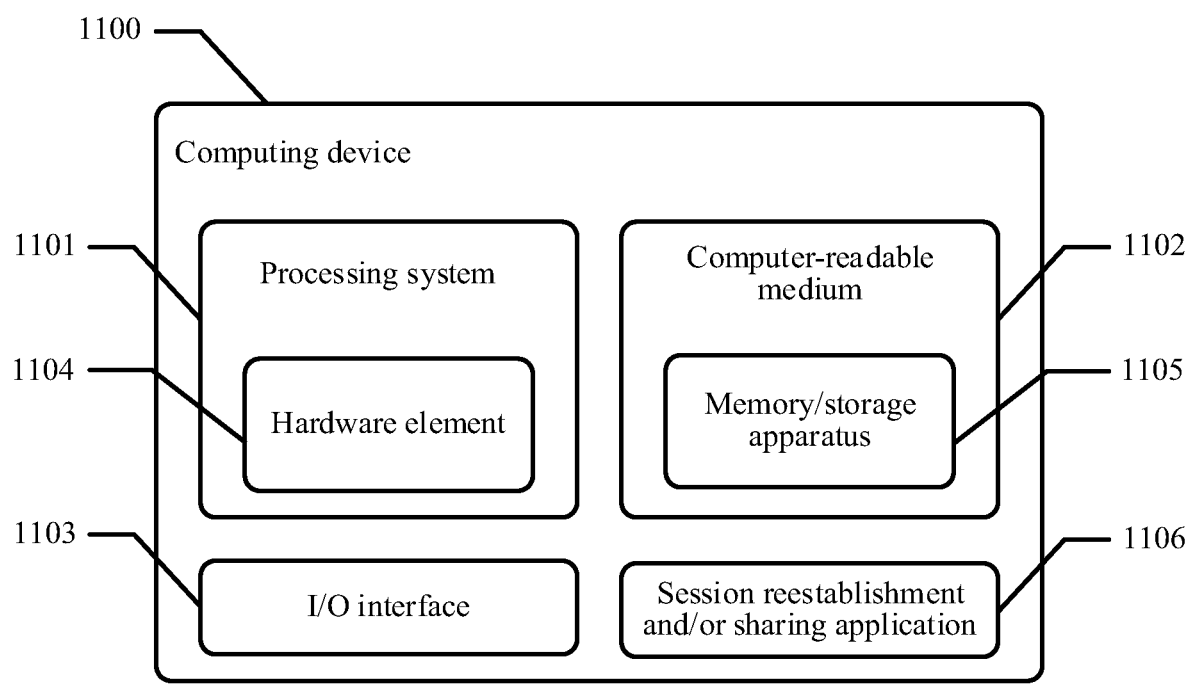
FIG. 11 is a schematic block diagram of a computing device according to an embodiment of the disclosure.

FIG. 11 is a schematic block diagram of a computing device 1100 provided in an embodiment of the disclosure.

The computing device 1100 may be a server, a desktop computer, a laptop, a tablet, a smartphone, a smartwatch, a wearable device, or other suitable computing devices or computing systems, which ranges from a full-resource device with large amount of memory and processor resources to a low-resource device with limited memory and/or processor resources. In some embodiments, any of the apparatuses 700, 800, 900, and 1000 described in FIG. 7 to FIG. 10 may use the form of the computing device 1100.

As the figure shows, the exemplary computing device 1100 includes a processing system 1101, one or more computer-readable media 1102, and one or more I/O interfaces 1103 communicatively coupled to each other. Although not shown, the computing device 1100 may also include a system bus or another data and command transfer system that couples various components to each other. The system bus may include any one or a combination of different bus structures such as a memory bus or memory controller, a peripheral bus, a universal serial bus, and/or a processor or local bus using any one of various bus architectures. Various other examples such as a control and data lines are further contemplated.

The processing system 1101 is representative of functionality to perform one or more operations by using hardware. Therefore, the processing system 1101 is illustrated as including a hardware element 1104 that may be configured as a processor, a functional block, or the like. This may include a dedicated integrated circuit implemented in hardware or another logic device formed using one or more semiconductors. The hardware element 1104 is not limited to a material forming the element or a processing mechanism employed therein. For example, the processor may be composed of semiconductor(s) and/or transistors (for example, electronic integrated circuits (ICs)). In such context, processor-executable instructions may be electronically executable instructions.

The computer-readable medium 1102 is illustrated as including a memory/storage apparatus 1105. The memory/storage apparatus 1105 represents the memory/storage capacity associated with one or more computer-readable media. The memory/storage apparatus 1105 may include a volatile medium (for example, a random access memory (RAM)) and/or a nonvolatile medium (for example, a read-only memory (ROM), a flash memory, an optical disc, a magnetic disk). The memory/storage apparatus 1105 may include fixed media (for example, a RAM, a ROM, or a fixed hard drive) and a removable medium (for example, a flash memory, a removable hard drive, an optical disc). For example, the memory/storage apparatus 1105 may be configured to store a session identifier of a session that can be reestablished or shared, or a status parameter of a session. The computer-readable medium 1102 may be configured in a variety of other ways as further described below.

The one or more I/O interfaces 1103 represent functions that allow the user to enter commands and information into the computing device 1100 and also allow various I/O devices to be used to display information to the user and/or send the information to other components or devices. Examples of input devices include a keyboard, a cursor control device (e.g., a mouse), a microphone (for example, used for voice input), a scanner, touch functionality (e.g., capacitive or other sensors that are configured to detect physical touch), a camera (e.g., which may employ visible or non-visible wavelengths such as infrared frequencies to recognize movements that do not involve touch as gestures), a network card, a receiver, and so forth. Examples of output devices include a display device (e.g., a monitor or projector), a speaker, a printer, a network card, a tactile-response device, a network card, a transmitter, and so forth. For example, the user may choose a session to be reestablished or shared through an input interface on the session initiator to cause the session initiator to initiate a corresponding reestablishment or sharing action.

The computing device 1100 may further include session reestablishment and/or session sharing application 1106. The session reestablishment and/or session reestablishment application 1106 may be stored in the memory/storage apparatus 1105 as computer program instructions. The session reestablishment and/or session reestablishment application 1106 and the processing system 1101 may implement the functions of all modules in all the apparatuses described in FIG. 7 to FIG. 10.

Various technologies may be described herein in the general context of software, hardware elements, or program modules. Generally, the modules, or code, include a routine, a program, an object, an element, a component, a data structure, and the like for executing a particular task or implementing a particular abstract data type. The terms "module", "code", "functionality", and "component" as used herein generally represent software, firmware, hardware, or a combination thereof. The features of the technologies described herein are platform-independent, which means that the technologies may be implemented on various computing platforms with various processors.

Implementations of the described modules and technologies may be stored on or transmitted across some form of computer-readable media. The computer-readable medium may include various media that may be accessed by the computing device 1100. For example but not limitation, the computer-readable medium may include a "computer-readable storage medium" and a "computer-readable signal medium".

Contrary to mere signal transmission, a carrier wave or a signal, the "computer-readable storage medium" refers to a medium and/or device, and/or a tangible storage apparatus capable of permanently storing information. Therefore, the computer-readable storage medium refers to a non-signal bearing medium. The computer-readable storage medium is hardware such as a storage device implemented by methods or technologies including volatile and nonvolatile, removable and non-removable media and/or suitable for storing information (for example, computer-readable instructions, data structures, program modules, logic elements/circuits, or other data). Examples of the computer-readable storage medium may include, but are not limited to, a RAM, a ROM, an EEPROM, a flash memory or other memory technologies, a CD-ROM, a digital versatile disk (DVD) or another optical storage apparatus, a hard disk, a cassette tape, a magnetic tape, a disk storage apparatus or other magnetic storage devices, or other storage devices, a tangible medium, or an article suitable for storing desired information and accessible by a computer.

The "computer-readable signal medium" refers to a signal-bearing medium configured to transmit instructions to hardware of the computing device 1100, such as via a network. The signal medium may typically embody computer-readable instructions, data structures, program modules, or other data in a modulated data signal such as a carrier wave, a data signal, or other transmission mechanisms. Signal media further include any information delivery media. The term "modulated data signal" refers to a signal that has one or more of its characteristics that are set or changed in such a manner as to encode information in the signal. For example but not limitation, a communication medium includes such as a wired network or a wired medium in direct connection, and a wireless medium such as acoustic, RF, infrared, and other wireless media.

As mentioned above, the hardware element 1104 and the computer-readable medium 1102 represent instructions, modules, code, programmable device logic and/or fixed device logic implemented in hardware, which in some embodiments can be used to implement at least some aspects of the technique described herein. The hardware component may include an IC or a system on a chip, an application-specific integrated circuit (ASIC), a field programmable gate array (FPGA), a complex programmable logic device (CPLD), and other implementations in silicon or components of other hardware devices. In this context, the hardware element can serve as a processing device that executes a program task defined by instructions, modules, and/or logic embodied by the hardware element, and as a hardware device that stores instructions for execution, for example, as previously described computer-readable storage medium.

The foregoing combinations may also be used to implement the techniques and modules described herein. Therefore, software, hardware or program modules and other program modules may be implemented as one or more instructions and/or logic embodied by one or more hardware elements 1104 on some form of the computer-readable storage medium. The computing device 1100 may be configured to implement a specific instruction and/or function corresponding to a software and/or hardware module. Therefore, for example, by using the computer-readable storage medium and/or hardware element 1104 of the processing system, the module may be implemented at least partially in hardware to implement the module as a module executable by the computing device 1100 as software. The instruction and/or function may be executable/operable by one or more articles (for example, one or more computing devices 1100 and/or processing systems 1101) to implement the techniques, modules, and examples described herein.

By studying the drawings, the disclosure, and the appended claims, those skilled in the art can understand and implement modifications to the disclosed embodiments when practicing the claimed subject matter. In the claims, the word "comprising" does not exclude other elements or operations, the indefinite article "a" or "an" does not exclude a plurality. The mere fact that certain measures are recorded in mutually different dependent claims does not indicate that the combination of the measures cannot be used for profit.

What is claimed is:

1. A method for session reestablishment, performed by a computer device, comprising:

transmitting a session reestablishment request of reestablishing a predetermined session to a session receiver, in a case that the predetermined session established with the session receiver is interrupted and the session receiver is determined as supporting reestablishment of the predetermined session; and receiving, from the session receiver, an acknowledgment for the session reestablishment request, and reestablishing the predetermined session with the session receiver according to a session reestablishment parameter of the predetermined session, the session reestablishment parameter of the predetermined session being determined based on a status parameter of the predetermined session during interruption, wherein the status parameter specifies a resumption position of data transmission occurring in the predetermined session, and wherein the reestablishing the predetermined session with the session receiver according to a session reestablishment parameter of the predetermined session comprises:

reestablishing the predetermined session with the session receiver on one of a plurality of links according to the session reestablishment parameter of the predetermined session different from a first link in a case that the predetermined session is interrupted on the first link, wherein the plurality of links comprise the first link.

2. The method according to claim 1, further comprising:

receiving a session deletion frame from the session receiver, the session deletion frame being used for requesting to delete the predetermined session, so that the predetermined session is interrupted; and transmitting an acknowledgment for the session deletion frame to the session receiver in response to the session deletion frame comprising a session-reestablishment-supported indicator, to determine, while the predetermined session is deleted, that the session receiver supports reestablishment of the predetermined session.

3. The method according to claim 1, further comprising:

transmitting a session deletion frame to the session receiver, the session deletion frame comprising a session-reestablishment-supported indicator and being used for requesting to delete the predetermined session so that the predetermined session is interrupted; and determining, based on an acknowledgment for the session deletion frame being received from the session receiver, that the session receiver supports reestablishment of the predetermined session while the predetermined session is deleted.

4. The method according to claim 2, wherein the transmitting a session reestablishment request of reestablishing a predetermined session to a session receiver comprises:

transmitting the session reestablishment frame to the session receiver, the session reestablishment frame comprising a session identifier of the predetermined session and being used for requesting to reestablish the predetermined session.

5. The method according to claim 4, wherein the session reestablishment frame further comprises the session reestablishment parameter of the predetermined session.

6. The method according to claim 1, further comprising:
transmitting a first session request frame to the session receiver, the first session request frame comprising a session-reestablishment-supported indicator and being used for request to establish the predetermined session with the session receiver;
receiving, from the session receiver, an acknowledgment for the first session request frame and a session response frame for the first session request frame; and
transmitting an acknowledgment for the session response frame to the session receiver, based on determining that the session response frame comprises the session-reestablishment-supported indicator, to determine, while the predetermined session is established with the session receiver, that the session receiver supports reestablishment of the predetermined session.

7. The method according to claim 6, wherein the transmitting a session reestablishment request of reestablishing a predetermined session to a session receiver comprises:
transmitting a second session request frame to the session receiver to request to reestablish the predetermined session, wherein
the second session request frame comprises: a session identifier of the predetermined session and the session-reestablishment-supported indicator.

8. The method according to claim 7, wherein the second session request frame further comprises the session reestablishment parameter of the predetermined session.

9. An apparatus for session reestablishment, comprising:
at least one memory configured to store program code; and
at least one processor configured to read the program code and operate as instructed by the program code, the program code comprising:
determining code configured to cause the at least one processor to determine whether a session receiver supports reestablishment of a predetermined session, in a case that the predetermined session established with the session receiver is interrupted;
request transmitting code configured to cause the at least one processor to transmit a session reestablishment request of reestablishing the predetermined session to the session receiver, in a case that the predetermined session established with the session receiver is interrupted and the session receiver is determined as supporting reestablishment of the predetermined session; and
reestablishment code configured to cause the at least one processor to reestablish, based on an acknowledgment for the session reestablishment request being received from the session receiver, the predetermined session with the session receiver according to a session reestablishment parameter of the predetermined session, the session reestablishment parameter of the predetermined session being determined based on a status parameter of the predetermined session during interruption,
where the status parameter specifies a resumption position of data transmission occurring in the predetermined session, and
wherein the reestablishment code is further configured to cause the at least one processor to:
reestablish the predetermined session with the session receiver on one of a plurality of links according to the session reestablishment parameter of the predetermined session different from a first link in a case that the predetermined session is interruped on a first link, wherein the plurality of links comprise the first link.

10. The apparatus according to claim 9, further comprising
deletion receiving code configured to cause the at least one processor to receive a session deletion frame from the session receiver, the session deletion frame being used for requesting to delete the predetermined session, so that the predetermined session is interrupted; and
acknowledgment transmitting code configured to cause the at least one processor to transmit an acknowledgment for the session deletion frame to the session receiver based on the session deletion frame comprising a session-reestablishment-supported indicator, to determine, while the predetermined session is deleted, that the session receiver supports reestablishment of the predetermined session.

11. The apparatus according to claim 9, further comprising:
deletion transmitting code configured to cause the at least one processor to transmit a session deletion frame to the session receiver, the session deletion frame comprising a session-reestablishment-supported indicator and being used for requesting to delete the predetermined session, so that the predetermined session is interrupted; and
reestablishment determining code configured to cause the at least one processor to determine, based on an acknowledgment for the session deletion frame being received from the session receiver, that the session receiver supports reestablishment of the predetermined session while the predetermined session is deleted.

12. The apparatus according to claim 10, wherein the request transmitting code is configured to cause that at least one processor to:
transmit the session reestablishment frame to the session receiver, the session reestablishment frame comprising a session identifier of the predetermined session and being used for requesting to reestablish the predetermined session.

13. The apparatus according to claim 12, wherein the session reestablishment frame further comprises the session reestablishment parameter of the predetermined session.

14. The apparatus according to claim 9, further comprising:
second request transmitting code configured to cause the at least one processor to transmit a first session request frame to the session receiver, the first session request frame comprising a session-reestablishment-supported indicator and being used for request to establish the predetermined session with the session receiver;
acknowledgment receiving code configured to cause the at least one processor to receive, from the session receiver, an acknowledgment for the first session request frame and a session response frame for the first session request frame; and
second acknowledgment transmitting code configured to cause the at least one processor to transmit an acknowledgment for the session response frame to the session receiver, based on determining that the session response frame comprises the session-reestablishment-supported indicator, to determine, while the predetermined session is established with the session receiver, that the session receiver supports reestablishment of the predetermined session.

15. The apparatus according to claim 14, wherein the request transmitting code is further configured to cause that at least one processor to:

transmit a second session request frame to the session receiver to request to reestablish the predetermined session, wherein the second session request frame comprises: a session identifier of the predetermined session and the session-reestablishment-supported indicator.

16. The apparatus according to claim 15, wherein the second session request frame further comprises the session reestablishment parameter of the predetermined session.

17. A non-volatile computer-readable storage medium, storing a computer program that when executed by at least one processor causes the at least one processor to:

transmit a session reestablishment request of reestablishing a predetermined session to a session receiver, in a case that the predetermined session established with the session receiver is interrupted and the session receiver is determined as supporting reestablishment of the predetermined session; and receive, from the session receiver, an acknowledgment for the session reestablishment request, and reestablish the predetermined session with the session receiver according to a session reestablishment parameter of the predetermined session, the session reestablishment parameter of the predetermined session being determined based on a status parameter of the predetermined session during interruption, wherein the status parameter specifies a resumption position of data transmission occurring in the predetermined session, and wherein the reestablish the predetermined session with the session receiver according to a session reestablishment parameter of the predetermined session comprises:

reestablishing the predetermined session with the session receiver on one of a plurality of links according to the session reestablishment parameter of the predetermined session different from a first link in a case that the predetermined session is interrupted on the first link, wherein the plurality of links comprise the first link.

18. The non-volatile computer-readable storage medium according to claim 17, further configured to cause the at least one processor to:

receive a session deletion frame from the session receiver, the session deletion frame being used for requesting to delete the predetermined session so that the predetermined session is interrupted; and transmit an acknowledgment for the session deletion frame to the session receiver in response to the session deletion frame comprising a session-reestablishment-supported indicator, to determine, while the predetermined session is deleted, that the session receiver supports reestablishment of the predetermined session.

* * * * *